US012579128B1

(12) United States Patent　(10) Patent No.: US 12,579,128 B1

Esman　(45) Date of Patent: Mar. 17, 2026

(54) HIGH-SPEED ANOMALY DETECTION FOR LARGE DATASETS

(71) Applicant: SPLUNK INC., San Francisco, CA (US)

(72) Inventor: Gleb Esman, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 3 days.

(21) Appl. No.: 18/422,670

(22) Filed: Jan. 25, 2024

(51) Int. Cl.
　*G06F 16/23*　(2019.01)
　*G06F 16/22*　(2019.01)
　*G06F 16/28*　(2019.01)

(52) U.S. Cl.
　CPC .......... *G06F 16/2365* (2019.01); *G06F 16/22* (2019.01); *G06F 16/288* (2019.01)

(58) Field of Classification Search
　CPC .......................... G06F 16/24573; G06F 16/248
　See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 8,874,526 B2 * | 10/2014 | Hsieh ................ | G06F 16/24568 |
| | | | 707/672 |
| 9,215,240 B2 | 12/2015 | Merza et al. | |
| 9,286,413 B1 | 3/2016 | Coates et al. | |

| | | | |
|---|---|---|---|
| 9,516,053 B1 * | 12/2016 | Muddu ............... | G06F 16/9024 |
| | | | 707/672 |
| 10,127,258 B2 | 11/2018 | Lamas et al. | |
| 2017/0220632 A1 * | 8/2017 | Miller ................. | G06F 16/9535 |
| | | | 707/672 |
| 2018/0219888 A1 * | 8/2018 | Apostolopoulos ........................... | |
| | | | H04L 63/1425 |
| | | | 707/672 |
| 2019/0098106 A1 | 3/2019 | Mungel et al. | |
| 2019/0235941 A1 * | 8/2019 | Bath ..................... | G06F 11/079 |
| | | | 707/672 |

(Continued)

OTHER PUBLICATIONS

Splunk Enterprise 8.0.0 Overview, available online, retrieved May 20, 2020 from docs.splunk.com., 17 pages.

(Continued)

*Primary Examiner* — Yuk Ting Choi

(74) *Attorney, Agent, or Firm* — Rutan & Tucker, LLP; Kyle M. St. James

(57) ABSTRACT

The various implementations provide for techniques to ingest raw data into a set of events and sample a subset of the events for initial processing via high-speed anomaly detection. The high-speed anomaly detection techniques use a first set of sensitivities that enable fast detection of potential anomalies within the subset of events. The subset of events is also included in a full set of events that are stored in an index and processed via full-scale anomaly detection. The full-scale anomaly detection uses a second set of sensitivities that enable the system to detect anomalies from the full set of events accurately. Upon detecting an anomaly using the high-speed or full-scale detection techniques, the system performs actions to notify entities or automatically mitigate the effects of the anomaly such as mitigation actions to quell potentially fraudulent activity.

22 Claims, 8 Drawing Sheets

300

| Time 332 | Machine Data 330 | Host 334 | Source 336 | Sourcetype 338 | Sample Flag 340 |
|---|---|---|---|---|---|
| 320 → 10/10/2000 1:55 p.m. | 321  341  342 <br> 127.0.0.1 – eva [10/Oct/2000:13:55:36-0700] "GET/apache.gif HTTP/1.0" 200 2326 0.0947 ← 346　343 <br> 344  345 | www1 | access.log | access_ combined | 1 |
| 322 → 10/10/2000 1:56 p.m. | 127.0.0.1 – emerson [10/Oct/2000:13:56:36-0700] "GET/eastwood.gif HTTP/1.0" 200 2980 0.0899 | www2 | access.log | access_ combined | 34 |
| 324 → 10/10/2000 1:57 p.m. | 127.0.0.3 – eliza [10/Oct/2000:13:57:36-0700] "GET/ezra.gif HTTP/1.0" 200 2900 0.0857 | www2 | access.log | access_ combined | 29 |
| 326 → 10/10/2000 1:58 p.m. | [Sunday Oct 10 1:58:33 2010] [error] [client 127.10.1.1. 015] File does not exist: /home/emmeline/pub_ html/images/alisia.gif | www2 | error.log | apache_ error | 72 |

(56)           References Cited

U.S. PATENT DOCUMENTS

| | | | | |
|---|---|---|---|---|
| 2020/0177611 A1* | 6/2020 | Bharrat | ................. | H04L 43/045 |
| | | | | 707/672 |
| 2021/0286874 A1* | 9/2021 | Jin | ........................ | G06F 21/577 |
| | | | | 707/672 |
| 2024/0022583 A1* | 1/2024 | Miserendino | ....... | H04L 63/1425 |
| | | | | 707/672 |
| 2025/0004868 A1* | 1/2025 | Altman | ................. | G06F 11/142 |
| | | | | 707/737 |

OTHER PUBLICATIONS

Splunk Cloud 8.0.2004 User Manual, available online, retrieved May 20, 2020 from docs.splunk.com., 66 pages.
Splunk Quick Reference Guide, updated 2019, available online at https://www.splunk.com/pdfs/solution-guides/splunk-quick-reference-guide.pdf. retrieved May 20, 2020, 6 pages.
Carraso, David, "Exploring Splunk," published by CITO Research, New York, NY., Apr. 2012, 156 pages.
Bitincka, Ledion et al., "Optimizing Data Analysis with a Semi-structured Time Series Database". self-published, first presented at "Workshop on Managing Systems via Log Analysis and Machine Learning Techniques (SLAML)"., Vancouver, British Columbia, Oct. 3, 2010, 9 pages.

* cited by examiner

| Time 332 | Machine Data 330 | Host 334 | Source 336 | Sourcetype 338 | Sample Flag 340 |
|---|---|---|---|---|---|
| 10/10/2000 1:55 p.m. | 127.0.0.1 – eva [10/Oct/2000:13:55:36-0700] "GET/apache.gif HTTP/1.0" 200 2326 0.0947 0.0947 | www1 | access.log | access_ combined | 1 |
| 10/10/2000 1:56 p.m. | 127.0.0.1 – emerson [10/Oct/2000:13:56:36-0700] "GET/ eastwood.gif HTTP/1.0" 200 2980 0.0899 | www2 | access.log | access_ combined | 34 |
| 10/10/2000 1:57 p.m. | 127.0.0.3 – eliza [10/Oct/2000:13:57:36-0700] "GET/ezra.gif HTTP/1.0" 200 2900 0.0857 | www2 | access.log | access_ combined | 29 |
| 10/10/2000 1:58 p.m. | [Sunday Oct 10 1:58:33 2010] [error] [client 127.10.1.1. 015] File does not exist: /home/emmeline/pub_ html/images/alisia.gif | www2 | error.log | apache_ error | 72 |

HIGH-SPEED ANOMALY DETECTION FOR LARGE DATASETS

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

In particular, the large amount and diversity of data systems containing large amounts of structured, semi-structured, and unstructured data relevant to any search query can be massive and continues to grow rapidly. This technological evolution can give rise to various challenges in relation to collecting, managing, understanding, and effectively utilizing the data. For example, conventional approaches to searching and analyzing data effectively often requires a user to possess a high degree of proficiency in one or more computer languages. Further, the system performing the tasks commanded by the user often require long periods to fully process large datasets. For example, a user that is analyzing machine data associated with financial services must be proficient in one or more computer languages and also understand how the machine data relates to various aspects of the financial services industry to determine whether the retrieved data is relevant to an overall inquiry.

BRIEF DESCRIPTION OF THE DRAWINGS

Illustrative examples are described in detail below with reference to the following figures:

FIG. 3 is a table illustrating a set of events generated during ingestion, in accordance with example implementations.

DETAILED DESCRIPTION

Figure 1:
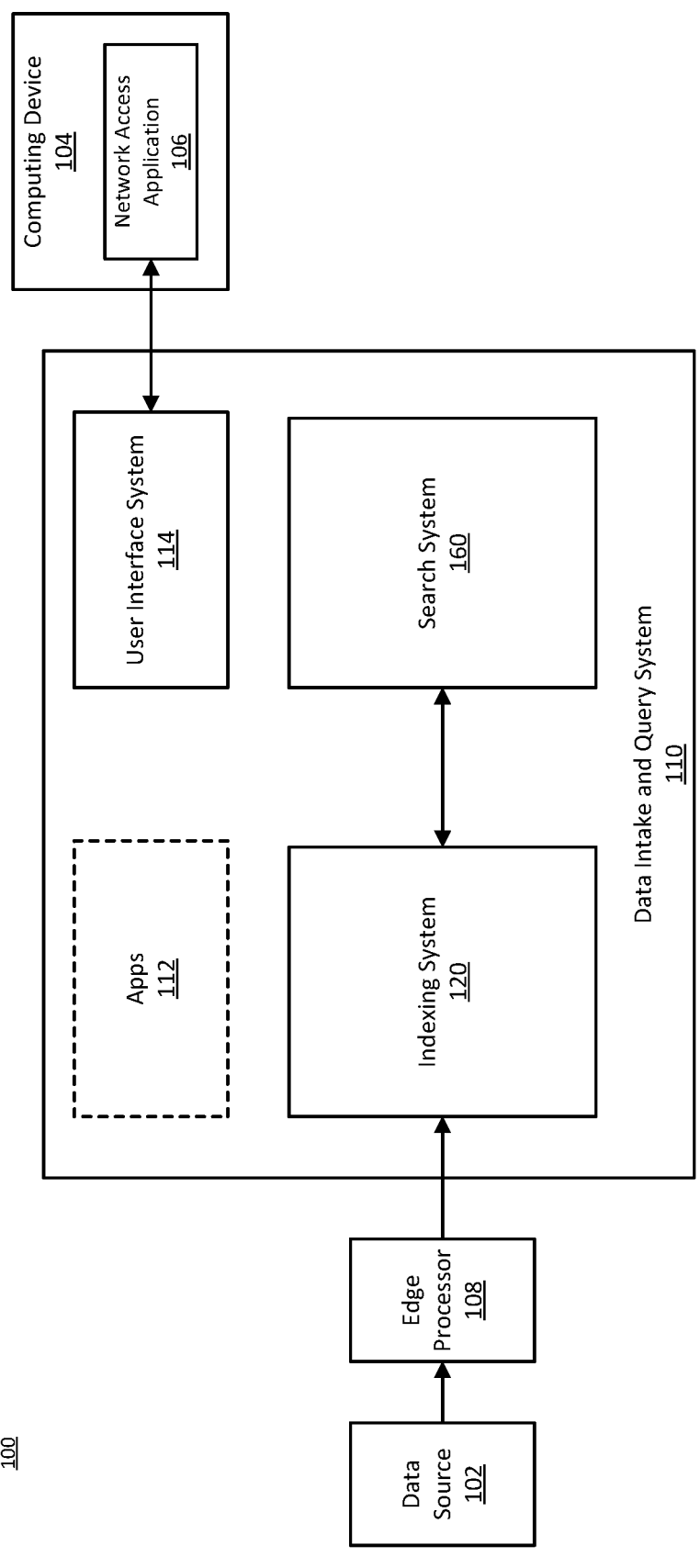
FIG. 1 is a block diagram illustrating an example computing environment that includes a data intake and query system, in accordance with example implementations.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of techniques are used to collect and analyze machine data. For example, edge devices coupled with sensors can be deployed within the IT environment to collect machine data and send the machine data to a data intake and query system. In such configurations, the edge devices and sensors function as data sources for the data intake and query system. The system may parse the machine data to produce events that each has a portion of machine data associated with a timestamp, and then store the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

One drawback with conventional approaches for querying events in the data intake and query system is that certain operations require long periods to fully process. For example, conventional systems can perform operations on ingested data and detect anomalies within the data. However, the mean time to detect (MTTD) associated with, ingesting data, detecting anomalies, and notifying entities of the potential anomalies is long after (e.g., over 30 minutes) the incidents that created the data has taken place. In certain environments, such long delays negatively affect the ability of entities to resolve the issue.

These and other challenges can be addressed by various examples of the present disclosure that, in some examples, provide for techniques to sample a subset of events during ingestion for initial processing via high-speed anomaly detection. The high-speed anomaly detection techniques use a first set of sensitivities that enable fast detection of potential anomalies. The subset of events is also included in a full set of events that are stored in an index and processed via full-scale anomaly detection. The full-scale anomaly detection uses a second set of sensitivities that enable the system to detect anomalies from the full set of events more accurately. Upon detecting an anomaly using the high-speed or full-scale detection techniques, the system performs actions to notify entities or automatically mitigate the effects of the anomaly (e.g., mitigation actions to quell potentially fraudulent activity).

At least one technological advantage of the disclosed techniques relative to prior techniques is that a data intake and query system can quickly detect a wide range of anomalous activity using a sample of all events, reducing the time necessary to ingest and process a sufficient number of events to detect an anomaly. As a result, the MTTD of the overall system decreases and enables entities to respond to potentially fraudulent activity faster. Furthermore, by using full-scale detection techniques on the full set of ingested events, the data intake and query system also accurately identifies anomalies that can only be detected from processing the full set events. Consequently, the data intake and query system accurately detects a full range of anomalies without sacrificing time associated with high-speed anomaly detection.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment. This operating status includes specific states, such as anomalies in retrieved data, as such anomalies can indicate fraudulent activity associated with the computing environment. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose. In such instances, the entity can administer the environment and/or perform associated actions, including reviewing the possible fraudulent activity, suspending actions associated with the anomalous activity, performing configuration and maintenance, performing repairs or replacements, provisioning additional resources, removing unused resources, or addressing issues that may arise during operation of the computing environment, among other examples.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

FIG. 1 is a block diagram illustrating an example computing environment 100 that includes a data intake and query system 110. As shown, the computing environment 100 includes, without limitation, a data source 102, an edge processor 108, a computing device 104, and a data intake and query system 110. The computing device 104 includes, without limitation, a network access application 106. The data intake and query system 110 includes, without limitation, a set of applications 112, a user interface system 114, an indexing system 120, and a search system 160.

In operation, the data intake and query system 110 obtains data from the data source 102 via one or more edge processors 108 and ingests the data using the indexing system 120. The search system 160 of the data intake and query system 110 enables users to navigate the indexed data. Though drawn with separate boxes in FIG. 1, in some implementations the indexing system 120 and the search system 160 can have overlapping components. The computing device 104, running a network access application 106, communicates with the data intake and query system 110 through a user interface system 114 of the data intake and query system 110. Using the computing device 104, a user can perform various operations with respect to the data intake and query system 110, such as administration of the data intake and query system 110, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 110 can further optionally include apps 112 that extend the search, analytics, and/or visualization capabilities of the data intake and query system 110. In some implementations, the edge processor 108 optionally includes one or more apps 112 to extend capabilities of the edge processor 108. For example, the edge processor 108 can include a machine learning (ML) model trained to filter, sample, and/or aggregate data before transmitting the data to the data intake and query system 110.

The data intake and query system 110 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 110 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 110 can be executed on a single computing device, or execution of the program code can be distributed over multiple computing devices. For example, the program code can include instructions for both indexing and search components (which may be part of the indexing system 120 and/or the search system 160, respectively), which can be executed on a computing device that also provides the data source 102. As another example, the program code can be executed on one computing device, where execution of the program code provides both indexing and search components, while another copy of the program code executes on a second computing device that provides the data source 102. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 102 of the computing environment 100 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 102 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples.

Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the edge processor 108 and/or the indexing system 120 obtains machine data from the data source 102 and processes and stores the data. For example, the edge processor 108 can receive data from the data source 102 and process the data before forwarding the data to the data intake and query system 110. Alternatively, in another example, the edge processor 108 is not present in the computing environment 100. In such instances, the indexing system 120 receives the data from the data source 102 and processes the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. In various implementations, the edge processor 108 and/or indexing system 120 does not require prior knowledge of the structure of incoming data (e.g., the edge processor 108 and/or the indexing system 120 does not need to be provided with a schema describing the data). Additionally, the indexing system 120 retains a copy of the data as it was received by the indexing system 120 such that the original data is always available for searching (e.g., no data is discarded, though, in some examples, the edge processor 108 and/or the indexing system 120 can be configured to do so).

The search system 160 searches the data stored by the indexing system 120. As discussed in greater detail below, the search system 160 enables users associated with the computing environment 100 (and possibly also other users) to navigate the data, generate reports, and visualize search results in "dashboards" output using a graphical interface. Using the facilities of the search system 160, users can obtain insights about the data, such as retrieving events from an index, calculating metrics, searching for specific conditions within a rolling time window, identifying patterns in the data (e.g., anomaly detection), and predicting future trends, among other examples. To achieve greater efficiency, the search system 160 can apply map-reduce methods to parallelize searching of large volumes of data. In some implementations, one or more of the edge processor 108, the indexing system 120, and/or the search system 160 can select a subset of data to perform searching of a smaller volume of data before searching the full volume of data. Additionally, because the original data is available, the search system 160 can apply a schema to the data at search time. This allows different structures to be applied to the same data, or for the structure to be modified if or when the content of the data changes. Application of a schema at search time may be referred to herein as a late-binding schema technique.

The user interface system 114 provides mechanisms through which users associated with the computing environment 100 (and possibly others) can interact with the data intake and query system 110. These interactions can include configuration, administration, and management of the indexing system 120, initiation and/or scheduling of queries that are to be processed by the search system 160, receipt or reporting of search results, and/or visualization of search results. The user interface system 114 can include, for example, facilities to provide a command line interface or a web-based interface.

Users can access the user interface system 114 using a computing device 104 that communicates with data intake and query system 110, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 100. For example, a person can log in as a particular user and, using the user's digital information, can access the data intake and query system 110. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 104 can provide a human-machine interface through which a person can have a digital presence in the computing environment 100 in the form of a user. The computing device 104 is an electronic device having one or more processors and a memory capable of storing instructions for execution by the one or more processors. The computing device 104 can further include input/output (I/O) hardware and a network interface. Applications executed by the computing device 104 can include a network access application 106, such as a web browser, which can use a network interface of the client computing device 104 to communicate, over a network, with the user interface system 114 of the data intake and query system 110. The user interface system 114 can use the network access application 106 to generate user interfaces that enable a user to interact with the data intake and query system 110. A web browser is one example of a network access application. A shell tool can also be used as a network access application. In some examples, the data intake and query system 110 is an application executing on the computing device 104. In such examples, the network access application 106 can access the user interface system 114 without going over a network.

The data intake and query system 110 can optionally include apps 112. An app of the data intake and query system 110 is a collection of configurations, knowledge objects (a user-defined entity that enriches the data in the data intake and query system 110), views, and dashboards that may provide additional functionality, different techniques for searching the data, and/or additional insights into the data. The data intake and query system 110 can execute multiple applications simultaneously. Example applications include an information technology service intelligence application, which can monitor and analyze the performance and behavior of the computing environment 100, and an enterprise security application, which can include content and searches to assist security analysts in diagnosing and acting on anomalous or malicious behavior in the computing environment 100.

Though FIG. 1 illustrates only one data source, in practical implementations, the computing environment 100 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 100, the data intake and query system 110 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 100 can include on-prem and cloud-based computing resources, or only cloud-based resources. For example, an entity may have on-prem computing devices and a private cloud. In this example, the entity operates the data intake and query system 110 and can choose to execute the data intake and query system 110 on an on-prem computing device or in the cloud. In another example, a provider entity operates the data intake and query system 110 in a public cloud and provides the functionality of the data intake and query system 110 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 110. In some implementations, the entity providing the data intake and query system 110 is itself subscribing to the cloud services of a cloud service provider. As an example, a first entity provides computing resources under a public cloud service model, a second entity subscribes to the cloud services of the first provider entity and uses the cloud computing resources to operate the data intake and query system 110, and a third entity can subscribe to the services of the second provider entity in order to use the functionality of the data intake and query system 110. In this example, the data sources are associated with the third entity, users accessing the data intake and query system 110 are associated with the third entity, and the analytics and insights provided by the data intake and query system 110 are for purposes of the third entity's operations.

Figure 2:
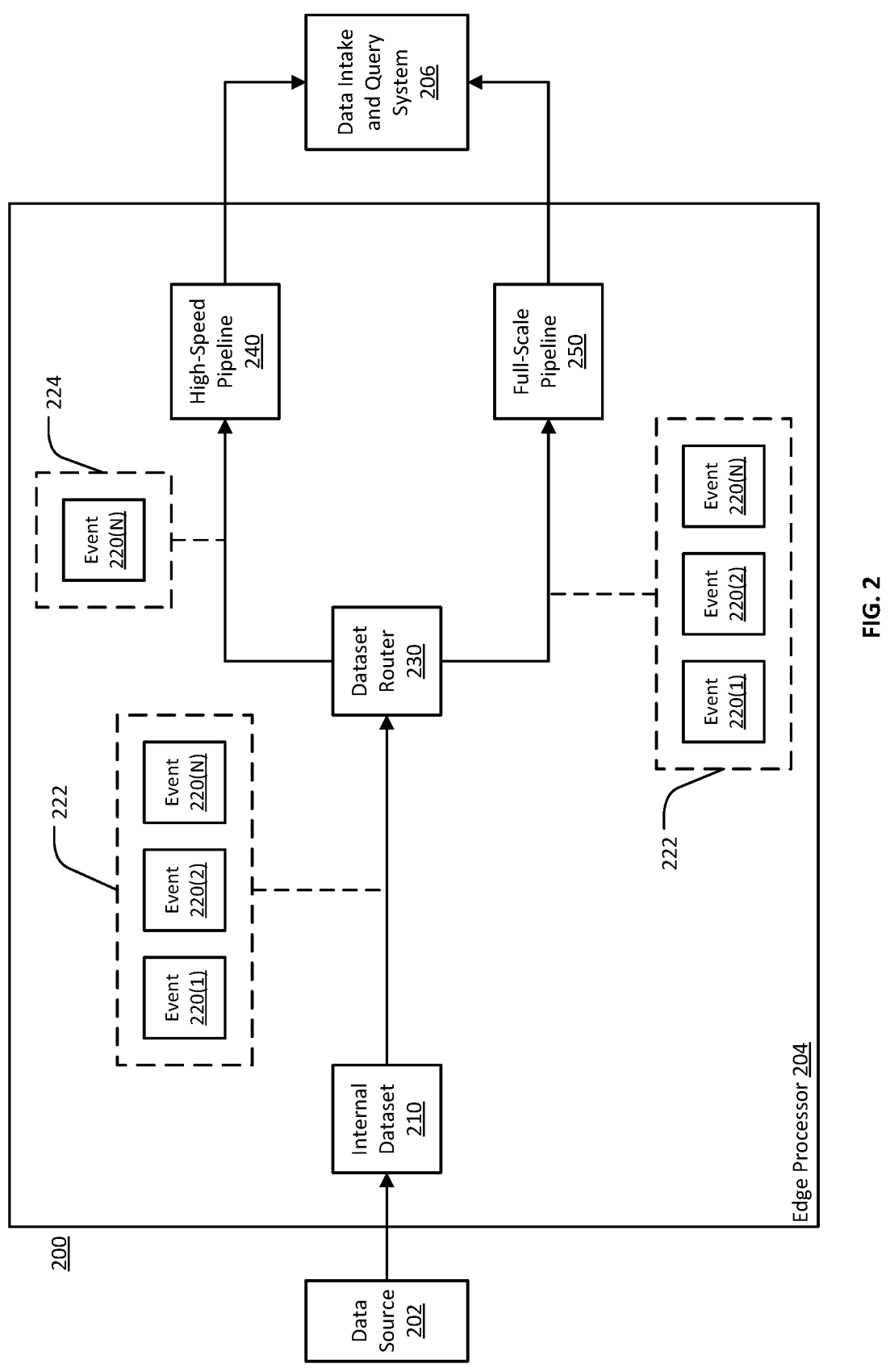
FIG. 2 is a block diagram illustrating an example edge processor of FIG. 1 processing a set of events using parallel pipelines, in accordance with example implementations.

FIG. 2 is a block diagram illustrating an example edge processor of FIG. 1 processing a set of events using parallel pipelines, in accordance with example implementations. As shown, the computing environment 200 includes, without limitation, a data source 202, an edge processor 204, and a data intake and query system 206. The edge processor 204 includes an internal dataset 210, a dataset router 230, a high-speed pipeline 240, and a full-scale pipeline 250.

In operation, the edge processor 204 ingests data provided by the data source 202 and forwards the data to the data intake and query system 206. In various implementations, the edge processor 204 ingests raw machine data by generating a set of events 220 (e.g., the events 220(1), 220(2), . . . 220(N)) as the internal dataset 210. The dataset router 230 performs operations on the full set of events 222 by sampling a subset of events 224 (e.g., the event 220(N)) and forwarding the sampled set of events 224 to the high-speed pipeline 240. The dataset router 230 forwards the full set of events to a full-scale pipeline 250. Each of the pipelines 240, 250 performs various operations on the received events; the high-speed pipeline 240 performs high-speed anomaly detection operations while the full-scale pipeline performs other processing operations on the full set of events 222, such as full-scale anomaly detection. In various implementations, the high-speed pipeline 240 and/or the full-scale pipeline perform various operations to detect one or more anomalies, such as identifying specific events and/or a series of events that deviate from a standard. For example, the high-speed pipeline 240 can process a sample of events representing web server logs to detect fraudulent activity by identifying user accounts with anomalous metadata. In another example, the full-scale pipeline 250 can process a full set of events representing transaction data to identify anomalous combinations of transactions.

In various implementations, the edge processor 204 is a device that allocates resources to process and route data generated by the data source 202. In some implementations, the edge processor 204 includes one or more applications to manage how the edge processor 204 ingests data and/or processes events. For example, the edge processor 204 can implement an edge processor service that executes instructions to reduce, filter, sample, and/or aggregate incoming machine data and/or events 220 generated from the machine data. For example, the edge processor service can input the events 220 into the dataset router 230 that includes a trained ML model. In such instances, the dataset router 230 can use the trained ML model to classify events for routing via the high-speed pipeline 240 or the full-scale pipeline 250.

In various implementations, the edge processor 204 merges the received data into the internal dataset 210. In some implementations, the edge processor 204 processes the internal dataset 210 to generate the full set of events 222. For example, the edge processor 204 can receive machine data from multiple devices and merges the machine data into the internal dataset 210 before generating the full set of events 222.

The dataset router 230 implements various instructions to select a subset of events 222 as a sampled set of events 224. For example, the dataset router 230 can include instructions to randomly sample 1% to 10% of the full set of events 222. In such instances, the dataset router 230 can perform various operations to randomly generate a partition that includes the selected events 220 (e.g., the event 220(N)) from the full set of events 222. Alternatively, the dataset router 230 can include instructions to periodically sample an event (e.g., select every 1000th event 220), or select a subset based on one or more criteria (e.g., select all physical badge "access denied" events occurring between 2 AM-5 AM). In such instances, the dataset router 230 generates a partition that includes each event 220 that matches the selection criteria.

As will be discussed in further detail in relation to FIG. 3, in some implementations, the edge processor 204 adds a sampling flag field and randomly assigns a sampling field value. In such instances, the edge processor 204 specifies a field value or range of field values that indicates that the event 220 is to be included in the sampled set of events 224. In such instances, the dataset router 230 classifies each event 220 either as being included in the sampled set of events 224 or being excluded from the sampled set of events 224 based on whether a given event 220 includes a field value matching a field value specified by the edge processor 204. As will be discussed in further detail in relation to FIG. 5, in some implementations, the edge processor 204 routes the sampled set of events 224 to a different index than the remaining set of events (e.g., 220(1), 220(2), etc.). In such instances, the high-speed pipeline 240 uses a high-speed index as a destination for the sampled set of events 224, while the full-scale pipeline 250 uses a different index as a destination for the remaining set of events.

The high-speed pipeline 240 processes a sampled set of events 224 and sends the processed event to the data intake and query system 206. For example, the high-speed pipeline 240 can include instructions to perform various operations, such as one or more high-speed anomaly detection operations, on the sampled set of events 224. In some implementations, the instructions for the pipeline specify which data to process. In such instances, the high-speed pipeline 240 performs the functions of the dataset router 230 and selects the sampled set of events 224 for processing.

The full-scale pipeline processes a set of events and sends the set of events to the data intake and query system 206. In some implementations, the full-scale pipeline 250 performs full-scale anomaly detection operations. In such instances, the full-scale pipeline 250 acts as a default pipeline and receives the full set of events 222 (where the sampled set of events 224 is processed by each pipeline 240, 250). Alternatively, the full-scale pipeline 250 receives each event that was not routed to the high-speed pipeline 240. In such instances, the full-scale pipeline 250 does not perform full-scale anomaly detection operations; the data intake and query system uses the search system 160 to perform full-scale anomaly operations once the full set of events 222 is transmitted through the combination of the pipelines 240, 250.

FIG. 3 is a table 300 illustrating a set of events generated during ingestion, in accordance with example implementations. As shown, the table includes, without limitation, a time field 332, a machine data field 330, a host field 334, a source field 336, a sourcetype field 338, and a sample flag 340. It will be understood that the depiction of machine data and associated metadata as rows and columns in the table 300 of FIG. 3 is merely illustrative and is not intended to limit the data format in which the machine data and metadata is stored in various implementations described herein. In one embodiment, machine data can be stored in a compressed or encrypted format. In such implementations, the machine data can be stored with or be associated with data that describes the compression or encryption scheme with which the machine data is stored. The information about the compression or encryption scheme can be used to decompress or decrypt the machine data, and any metadata with which it is stored, at search time.

In various implementations, the edge processor 108, 204 and/or the indexing system 120 generates events 320-326 corresponding to portions of received machine data. In the illustrated embodiment, four events 320, 322, 324, 326 are shown in four rows. Each event 320-326 includes machine data 330 and a timestamp 332. The machine data 330 can correspond to the machine data received by the data intake and query system 110, 206. For example, in the illustrated embodiment, the machine data 330 of events 320, 322, 324, 326 corresponds to portions of the machine data after it was processed by the indexing system 160.

Metadata 334-340 associated with the events 320-326 is also shown in the table 300. In the illustrated embodiment, the metadata 334-340 includes information about a host 334, source 336, and sourcetype 338 associated with the events 320-326. In various implementations, the edge processor 108, 204 and/or the indexing system 160 adds a sample flag value as metadata associated with processing the events 320-326. Any of the metadata can be extracted from the corresponding machine data, or supplied or defined by an entity, such as a user or computer system. The metadata fields 334-340 can become part of, stored with, or otherwise associated with the events 320-326. In certain implementations, the metadata 334-340 can be stored in a separate file and associated with a machine data file. In some cases, while the timestamp 332 can be extracted from the raw data of each event, the values for the other metadata fields may be determined by the indexing system 120 based on information it receives pertaining to the host device 104 or data source of the data separate from the machine data.

While certain default or user-defined metadata fields can be extracted from the machine data for indexing purposes, the machine data within an event can be maintained in its original condition. As such, in implementations in which the portion of machine data included in an event is unprocessed or otherwise unaltered, it is referred to herein as a portion of raw machine data. For example, in the illustrated embodiment, the machine data of events 320-326 is identical to the portions of the machine data used to generate a particular event. Similarly, the entirety of the machine data can be found across multiple events. As such, unless certain information needs to be removed for some reasons (e.g. extraneous information, confidential information), all the raw machine data contained in an event can be preserved and saved in its original form. Additionally, values can be added to the machine data (e.g., adding the sample flag value to the machine data) Accordingly, the data store in which the event records are stored is sometimes referred to as a "raw record data store." The raw record data store contains a record of the raw event data tagged with the various fields.

In other implementations, the portion of machine data in an event can be processed or otherwise altered relative to the machine data used to create the event. With reference to the machine data, the machine data of a corresponding event (or events) may be modified such that only a portion of the machine data is stored as one or more events. For example, in some cases, only a portion the machine data may be retained as one or more events, or the machine data may be altered to remove duplicate data, confidential information, etc.

In FIG. 3, the first three rows of the table 300 present events 320, 322, and 324 and are related to a server access log that records requests from multiple clients processed by a server, as indicated by entry of "access.log" in the source column 336. In the example shown in FIG. 3, each of the events 320-324 is associated with a discrete request made to the server by a client. The raw machine data generated by the server and extracted from a server access log can include the IP address 321 of the client, the user id 341 of the person requesting the document, the time 342 the server finished processing the request, the request line 343 from the client, the status code 344 returned by the server to the client, the size of the object 345 returned to the client (in this case, the gif file requested by the client) and the time spent 346 to serve the request in microseconds. In the illustrated implementations of FIG. 3, all the raw machine data retrieved from the server access log is retained and stored as part of the corresponding events 320-324 in a separate file. The event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3 is advantageous because it allows search of all the machine data at search time instead of searching only previously specified and identified fields or field-value pairs. As mentioned above, because data structures used by various implementations of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

In various implementations, the device generating the events 320-326 can add the sample flag value 340 to the machine data 330 and/or the events 320-326. For example, the edge processor 108, 204 can add random values within a certain range (e.g., values between 00-99) for the sample flag 340. In such instances, a device selecting the sampled set of event 224 can select events 220 by comparing the sample flag values 340 to a specific criterion or criteria and selecting the events that match the criteria.

For example, the edge processor 204 can be configured to select 10% of all events 220. In such instances, the edge processor 204 can randomly assign a value between 0-9 and then select for the sampled set of events 224 each event that matches a specific value (e.g., select each event 220 that has a sample flag value matching the value "4"). In the illustrated example, the indexing system adds a random value between 00-99 to each event 320-326. In such instances, the searching system 160 can select for the sampled set of events 224 an event with the sample flag value equal to "1", thereby selecting the event 320 for the sampled set of events 224. In some implementations, the edge processor 108 and/or the indexing system 120 can periodically select events 220 for the sampled set of events 224. In such instances, the edge processor 108 and/or the indexing system 120 increments the sampling field value 340 added to each successive event 320, 322, etc., and selects each event in matching a specific sampling flag value (e.g., selecting each 5th event out of 100 by selecting events having sampling flag values 340 matching "5").

Figure 4:
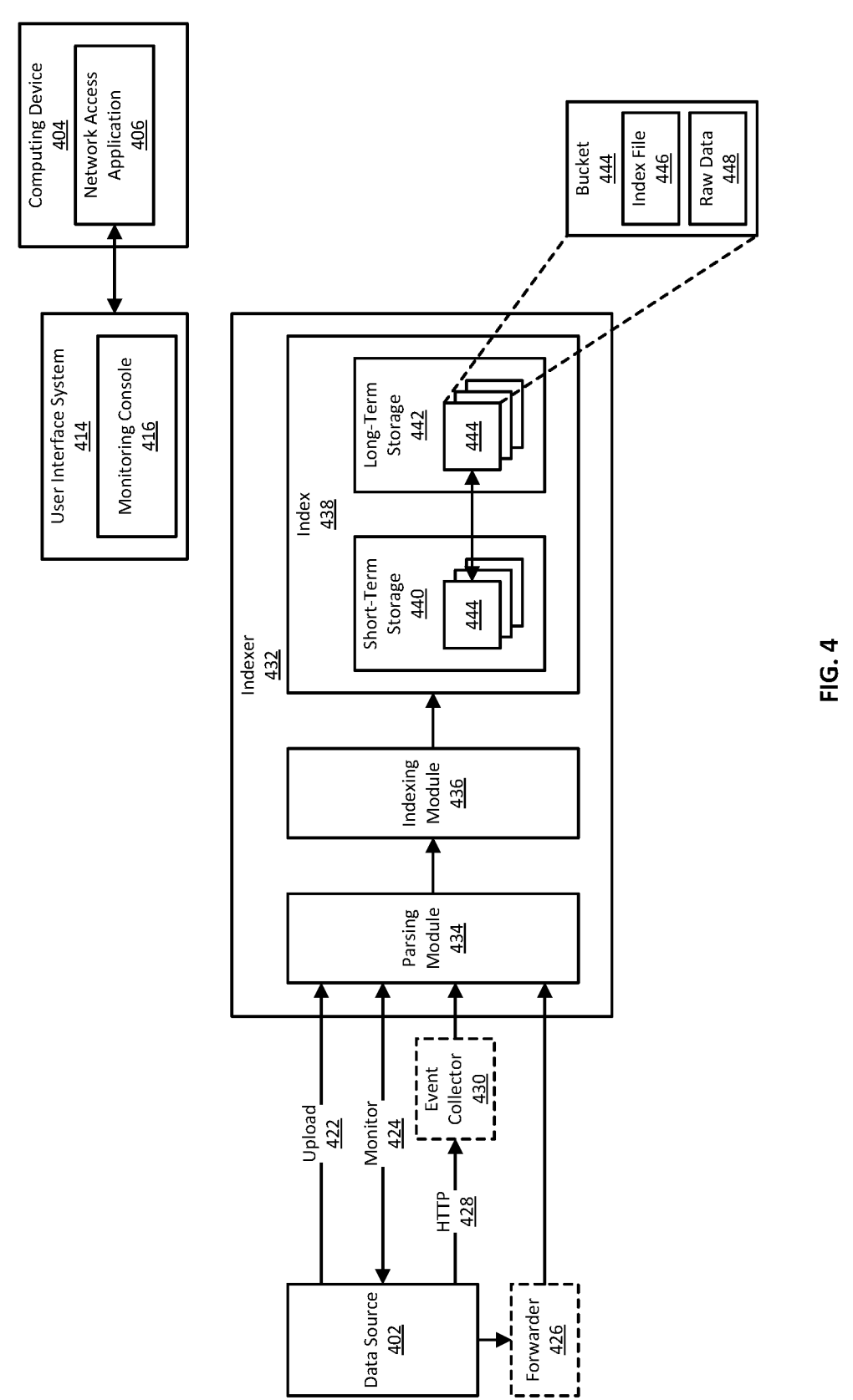
FIG. 4 is a block diagram illustrating in greater detail an example of an indexing system of a data intake and query system, in accordance with example implementations.

FIG. 4 is a block diagram illustrating in greater detail an example of an indexing system 420 of a data intake and query system, such as the data intake and query system 110 of FIG. 1. As shown, the indexing system 420 includes, without limitation, a data source 402, a computing device 404, a user interface system 414, a forwarder 426, an event collector 430, and an indexer 432. The computing device 404 includes, without limitation, a network access application 406. The user interface system 414 includes, without limitation, a monitoring console 416. The indexer 432 includes, without limitation, a parsing module 434, an indexing module 436, and an index 438. The index 432 includes, without limitation, short-term storage 440 including a set of buckets 444 (each containing an index file 446 and raw data 448), and long-term storage 442 containing a separate set of buckets 444.

In operation, the indexing system 420 of FIG. 4 uses various methods to obtain machine data from a data source 402 and stores the data in an index 438 of an indexer 432. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 420 enables the data intake and query system to obtain the machine data produced by the data source 402 and to store the data for searching and retrieval.

Users can administer the operations of the indexing system 420 using a computing device 404 that can access the indexing system 420 through a user interface system 414 of the data intake and query system. For example, the computing device 404 can be executing a network access application 406, such as a web browser or a terminal, through which a user can access a monitoring console 416 provided by the user interface system 414. The monitoring console 416 can enable operations such as: identifying the data source 402 for data ingestion; configuring the indexer 432 to index the data from the data source 402; configuring a data ingestion method; configuring, deploying, and managing clusters of indexers; and viewing the topology and performance of a deployment of the data intake and query system, among other operations. The operations performed by the indexing system 420 may be referred to as "index time" operations, which are distinct from "search time" operations that are discussed further below.

The indexer 432, which may be referred to herein as a data indexing component, coordinates and performs most of the index time operations. The indexer 432 can be implemented using program code that can be executed on a computing device. The program code for the indexer 432 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 432. In some implementations, the indexer 432 executes on the computing device 404 through which a user can access the indexing system 420. In some implementations, the indexer 432 executes on a different computing device than the illustrated computing device 404.

The indexer 432 may be executing on the computing device that also provides the data source 402 or may be executing on a different computing device. In implementations wherein the indexer 432 is on the same computing device as the data source 402, the data produced by the data source 402 may be referred to as "local data." In other implementations the data source 402 is a component of a first computing device and the indexer 432 executes on a second computing device that is different from the first computing device (e.g., the edge processor 108, 204 and/or another device). In these implementations, the data produced by the data source 402 may be referred to as "remote data." In some implementations, the first computing device is "on-prem" and in some implementations the first computing device is "in the cloud." In some implementations, the indexer 432 executes on a computing device in the cloud and the operations of the indexer 432 are provided as a service to entities that subscribe to the services provided by the data intake and query system.

For a given data produced by the data source 402, the indexing system 420 can be configured to use one of several methods to ingest the data into the indexer 432. These methods include upload 422, monitor 424, using a forwarder 426, or using HyperText Transfer Protocol (HTTP 428) and an event collector 430. These and other methods for data ingestion may be referred to as "getting data in" (GDI) methods.

Using the upload 422 method, a user can specify a file for uploading into the indexer 432. For example, the monitoring console 416 can include commands or an interface through which the user can specify where the file is located (e.g., on which computing device and/or in which directory of a file system) and the name of the file. The file may be located at the data source 402 or maybe on the computing device where the indexer 432 is executing. Once uploading is initiated, the indexer 432 processes the file, as discussed further below. Uploading is a manual process and occurs when instigated by a user. For automated data ingestion, the other ingestion methods are used.

The monitor 424 method enables the indexing system 420 to monitor the data source 402 and continuously or periodically obtain data produced by the data source 402 for ingestion by the indexer 432. For example, using the monitoring console 416, a user can specify a file or directory for monitoring. In this example, the indexing system 420 can execute a monitoring process that detects whenever the file or directory is modified and causes the file or directory contents to be sent to the indexer 432. As another example, a user can specify a network port for monitoring. In this example, a monitoring process can capture data received at or transmitting from the network port and cause the data to be sent to the indexer 432. In various examples, monitoring can also be configured for data sources such as operating system event logs, performance data generated by an operating system, operating system registries, operating system directory services, and other data sources.

Monitoring is available when the data source 402 is local to the indexer 432 (e.g., the data source 402 is on the computing device where the indexer 432 is executing).

Other data ingestion methods, including forwarding and the event collector 430, can be used for either local or remote data sources.

A forwarder 426, which may be referred to herein as a data forwarding component, is a software process that sends data from the data source 402 to the indexer 432. The forwarder 426 can be implemented using program code that can be executed on the computer device that provides the data source 402. A user launches the program code for the forwarder 426 on the computing device that provides the data source 402. The user can further configure the forwarder 426, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 426 can provide various capabilities. For example, the forwarder 426 can send the data unprocessed or can perform minimal processing on the data before sending the data to the indexer 432. Minimal processing can include, for example, adding metadata tags to the data to identify a source, source type, and/or host, among other information, dividing the data into blocks, and/or applying a timestamp to the data. In some implementations, the forwarder 426 can break the data into individual events (event generation is discussed further below) and send the events to a receiver. For example, the edge processor 108, 204 can be present and execute the forwarder 426 to generate the full set of events 222. Other operations that the forwarder 426 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 430 provides an alternate method for obtaining data from the data source 402. The event collector 430 enables data and application events to be sent to the indexer 432 using HTTP 428. The event collector 430 can be implemented using program code that can be executing on a computing device. The program code may be a component of the data intake and query system or can be a standalone component that can be executed independently of the data intake and query system and operates in cooperation with the data intake and query system.

To use the event collector 430, a user can, for example using the monitoring console 416 or a similar interface provided by the user interface system 414, enable the event collector 430 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 402 as an alternative method to using a username and password for authentication.

To send data to the event collector 430, the data source 402 is supplied with a token and can then send HTTP 428 requests to the event collector 430. To send HTTP 428 requests, the data source 402 can be configured to use an HTTP client and/or to use logging libraries such as those supplied by Java, JavaScript, and .NET libraries. An HTTP client enables the data source 402 to send data to the event collector 430 by supplying the data, and a Uniform Resource Identifier (URI) for the event collector 430 to the HTTP client. The HTTP client then handles establishing a connection with the event collector 430, transmitting a request containing the data, closing the connection, and receiving an acknowledgment if the event collector 430 sends one. Logging libraries enable HTTP 428 requests to the event collector 430 to be generated directly by the data source. For example, an application can include or link a logging library, and through functionality provided by the logging library manage establishing a connection with the event collector 430, transmitting a request, and receiving an acknowledgement.

An HTTP 428 request to the event collector 430 can contain a token, a channel identifier, event metadata, and/or event data. The token authenticates the request with the event collector 430. The channel identifier, if available in the indexing system 420, enables the event collector 430 to segregate and keep separate data from different data sources. The event metadata can include one or more key-value pairs that describe the data source 402 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 430 extracts events from HTTP 428 requests and sends the events to the indexer 432. The event collector 430 can further be configured to send events to one or more indexers. Extracting the events can include associating any metadata in a request with the event or events included in the request. In these implementations, event generation by the indexer 432 (discussed further below) is bypassed, and the indexer 432 moves the events directly to indexing. In some implementations, the event collector 430 extracts event data from a request and outputs the event data to the indexer 432, and the indexer generates events from the event data. In some implementations, the event collector 430 sends an acknowledgement message to the data source 402 to indicate that the event collector 430 has received a particular request form the data source 402, and/or to indicate to the data source 402 that events in the request have been added to an index.

The indexer 432 ingests incoming data and transforms the data into searchable knowledge in the form of events. In the data intake and query system, an event is a single piece of data that represents activity of the component represented in FIG. 4 by the data source 402. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 432 can include a parsing module 434 and an indexing module 436 for generating and storing the events. The parsing module 434 and indexing module 436 can be modular and pipelined, such that one component can operate on a first set of data while the second component simultaneously operates on a second set of data. Additionally, the indexer 432 can at any time have multiple instances of the parsing module 434 and indexing module 436, with each set of instances configured to simultaneously operate on data from the same data source or from different data sources. The parsing module 434 and indexing module 436 are illustrated in FIG. 4 to facilitate discussion, with the understanding that implementations with other components are possible to achieve the same functionality.

The parsing module 434 determines information about incoming event data, where the information can be used to identify events within the event data. For example, the parsing module 434 can associate a source type with the event data. A source type identifies the data source 402 and describes a possible data structure of event data produced by the data source 402. For example, the source type can indicate which fields to expect in events generated at the data source 402 and the keys for the values in the fields, and possibly other information such as sizes of fields, an order of the fields, a field separator, and so on. The source type of the data source 402 can be specified when the data source 402 is configured as a source of event data. Alternatively, the parsing module 434 can determine the source type from the event data, for example from an event field in the event data or using machine learning techniques applied to the event data.

Other information that the parsing module 434 can determine includes timestamps. In some cases, an event includes a timestamp as a field, and the timestamp indicates a point in time when the action represented by the event occurred or was recorded by the data source 402 as event data. In these cases, the parsing module 434 may be able to determine from the source type associated with the event data that the timestamps can be extracted from the events themselves. In some cases, an event does not include a timestamp and the parsing module 434 determines a timestamp for the event, for example from a name associated with the event data from the data source 402 (e.g., a file name when the event data is in the form of a file) or a time associated with the event data (e.g., a file modification time). As another example, when the parsing module 434 is not able to determine a timestamp from the event data, the parsing module 434 may use the time at which it is indexing the event data. As another example, the parsing module 434 can use a user-configured rule to determine the timestamps to associate with events.

The parsing module 434 can further determine event boundaries. In some cases, a single line (e.g., a sequence of characters ending with a line termination) in event data represents one event while in other cases, a single line represents multiple events. In yet other cases, one event may span multiple lines within the event data. The parsing module 434 may be able to determine event boundaries from the source type associated with the event data, for example from a data structure indicated by the source type. In some implementations, a user can configure rules the parsing module 434 can use to identify event boundaries.

The parsing module 434 can further extract data from events and possibly also perform transformations on the events. For example, the parsing module 434 can extract a set of fields (key-value pairs) for each event, such as a host or hostname, source or source name, and/or source type. The parsing module 434 may extract certain fields by default or based on a user configuration. Alternatively or additionally, the parsing module 434 may add fields to events, such as a source type, a sampling field (e.g., the sample flag 340), or a user-configured field. As another example of a transformation, the parsing module 434 can anonymize fields in events to mask sensitive information, such as social security numbers or account numbers. Anonymizing fields can include changing or replacing values of specific fields. The parsing module 434 can further perform user-configured transformations. The parsing module 434 outputs the results of processing incoming event data to the indexing module 436, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 432 can be configured to identify searchable segments that are parts of fields, searchable segments that are entire fields, or both. The parsing module 434 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 446, to find event data that matches a search query. In some implementations, segmentation can alternatively be performed by the forwarder 426. Segmentation can also be disabled, in which case the indexer 432 will not build a lexicon for the event data. When segmentation is disabled, the search system searches the event data directly.

Building index data structures generates the index 438. The index 438 is a storage data structure on a storage device (e.g., a disk drive or other physical device for storing digital data). The storage device may be a component of the computing device on which the indexer 432 is operating (referred to herein as local storage) or may be a component of a different computing device (referred to herein as remote storage) that the indexer 438 has access to over a network. The indexer 432 can manage more than one index and can manage indexes of different types. For example, the indexer 432 can manage event indexes, which impose minimal structure on stored data and can accommodate any type of data. As another example, the indexer 432 can manage metrics indexes, which use a highly structured format to handle the higher volume and lower latency demands associated with metrics data.

The indexing module 436 organizes files in the index 438 in directories referred to as buckets. The files in a bucket 444 can include raw data files, index files, and possibly also other metadata files. As used herein, "raw data" means data as when the data was produced by the data source 402, without alteration to the format or content. As noted previously, the parsing module 434 may add fields to event data and/or perform transformations on fields in the event data. Event data that has been altered in this way is referred to herein as enriched data. A raw data file 448 can include enriched data, in addition to or instead of raw data. The raw data file 448 may be compressed to reduce disk usage. An index file 446, which may also be referred to herein as a "time-series index" or tsidx file, contains metadata that the indexer 432 can use to search a corresponding raw data file 448. As noted above, the metadata in the index file 446 includes a lexicon of the event data, which associates each unique keyword in the event data with a reference to the location of event data within the raw data file 448. The keyword data in the index file 446 may also be referred to as an inverted index. In various implementations, the data intake and query system can use index files for other purposes, such as to store data summarizations that can be used to accelerate searches.

A bucket 444 includes event data for a particular range of time. The indexing module 436 arranges buckets in the index 438 according to the age of the buckets, such that buckets for more recent ranges of time are stored in short-term storage 440 and buckets for less recent ranges of time are stored in long-term storage 442. Short-term storage 440 may be faster to access while long-term storage 442 may be slower to access. Buckets may be moves from short-term storage 440 to long-term storage 442 according to a configurable data retention policy, which can indicate at what point in time a bucket is old enough to be moved.

A bucket's location in short-term storage 440 or long-term storage 442 can also be indicated by the bucket's status. As an example, a bucket's status can be "hot," "warm," "cold," "frozen," or "thawed." In this example, hot bucket is one to which the indexer 432 is writing data and the bucket becomes a warm bucket when the index 432 stops writing data to it. In this example, both hot and warm buckets reside in short-term storage 440. Continuing this example, when a warm bucket is moved to long-term storage 442, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 420 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 420 through the monitoring console 416 provided by the user interface system 414. Using the monitoring console 416, the user can configure and monitor an index cluster, and see information such as disk usage by an index, volume usage by an indexer, index and volume size over time, data age, statistics for bucket types, and bucket settings, among other information.

Figure 5:
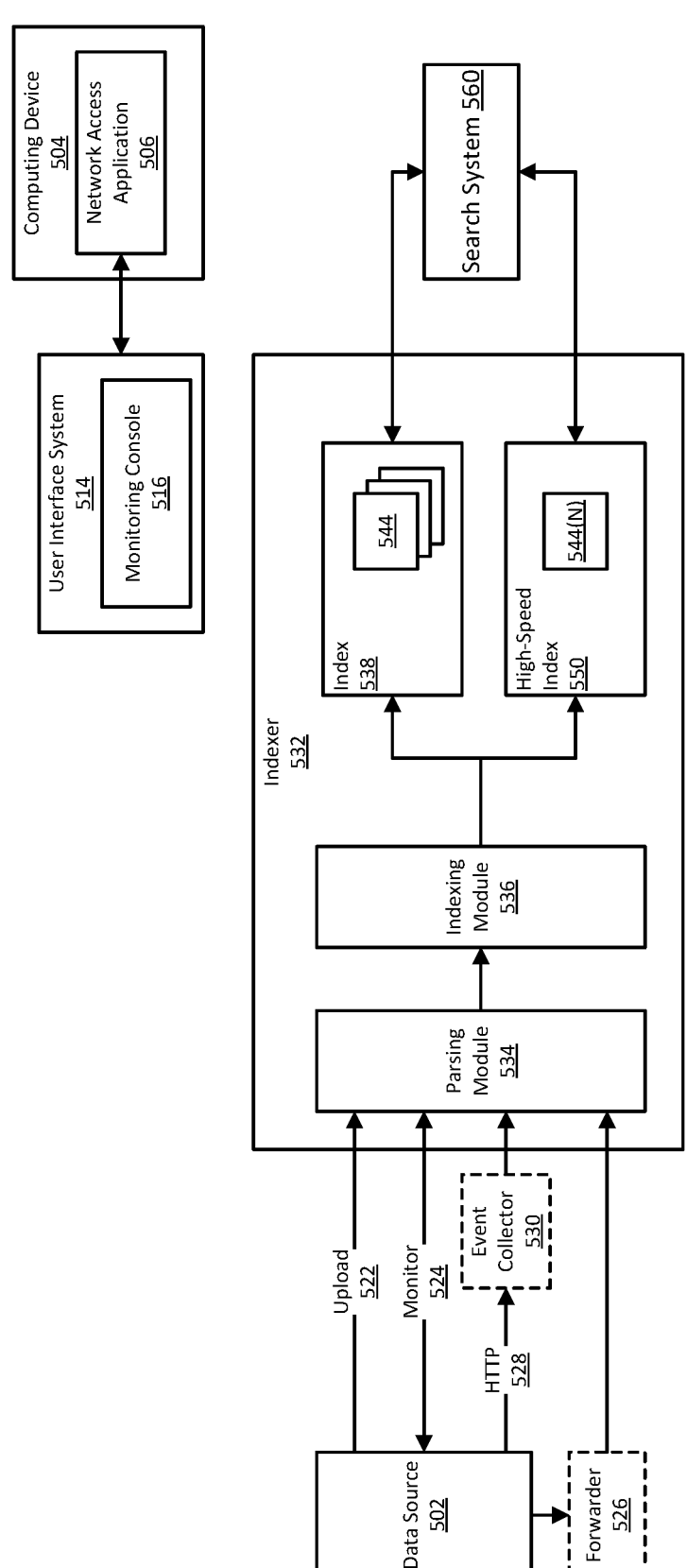
FIG. 5 is a block diagram illustrating in an example of an indexing system of a data intake and query system that includes multiple indexes, in accordance with example implementations.

FIG. 5 is a block diagram illustrating in an example of an indexing system 520 of a data intake and query system 110 that includes multiple indexes, in accordance with example implementations. As shown, the indexing system 520 includes, without limitation, a data source 502, a computing device 504, a user interface system 514, a forwarder 526, an event collector 530, an indexer 532, and a search system 560. The computing device 504 includes, without limitation, a network access application 506. The user interface system 514 includes, without limitation, a monitoring console 516. The indexer 532 includes, without limitation, a parsing module 534, an indexing module 536, an index 538, and a high-speed index 550. The index 538 includes, without limitation, a set of buckets. The high-speed index 550 includes, without limitation, a separate set of buckets 544 (N).

In operation, the indexer 532 ingests data received from the data source (e.g., via upload 522, monitor 524, HTTP 528 and event collector 530, and/or the forwarder 526) in a manner similar to the indexer 432 discussed in FIG. 4. In some implementations, the edge processor 104, 204 is present and can serve as the forwarder 526. Alternatively, in some implementations, the edge processor 104 is not present and the indexer 532 receives data from the data source via the upload 522, monitor 524, HTTP 528 and event collector 530, and/or a different forwarder 526. When the indexing module 536 indexes the full set of events 222, the indexing module 536 performs event segmentation and builds index data structures for each the index 538 and the high-speed index 550. For example, the indexer 532 can classify the subset of events 224 for storage in the high-speed index 550 and classifies the remaining set of events (e.g., 220(1), 220(2), etc.) for storage in the index 538. Alternatively, the high-speed pipeline 240 sets the high-speed index 550 as the destination for the sampled set of events 224 while the full-scale pipeline 250 sets the index 538 for the full set of events 222.

The search system 560 communicates with each of the high-speed index and the index 538 to perform anomaly detection operations. For example, the search system 560 searches the sampled set of events 224 stored in the high-speed index 550 to perform high-speed anomaly detection operations and identify potential anomalous or malicious behavior based on detected anomalies within the sampled set of events 224. In such instances, the search system 560 can perform specific actions corresponding to anomalies detected using the high-speed anomaly detection operations. For example, the search system 560 can provide the monitoring console 516 with a report that indicates a likelihood of fraudulent activity (e.g., "75%" or "high"). In such instances, the report can include a notification section, icon, or field that indicates that the likelihood of potentially fraudulent activity that was detected using high-speed detection operations. In another example, the search system 560 can perform automated actions associated with detecting anomalies using the high-speed detection operations. For example, upon identifying a particular IP address associated with high rates of errors in request (indicating potentially fraudulent activity), the monitoring console 516 can automatically block the identified IP address for a period of time.

In various implementations, the search system 560 processes the full set of events 222 by searching both the sampled set of events 224 stored in the high-speed index 550 and the remaining events stored in the index 538. Alternatively, the index 538 receives the full set of events 222 from the full-scale pipeline 250. In such instances, the search system 560 processes the full set of events 222 by searching the index 538. Upon accessing the full set of events 222, the search system 560 performs full-scale anomaly detection operations and identifies potential anomalous or malicious behavior based on detected anomalies within the full set of events 222.

As discussed above, the sampled set of events 224 can contain a much lower number of events (e.g., 1%). As a result, the search system 560 performing full-scale anomaly detection operations can take much longer to complete the full-scale anomaly detection operations on the full set of events 222. Due to searching the full set of events, the search system 560 may identify new and/or different anomalies than the anomalies detected using the high-speed anomaly detection operations. In such instances, the monitoring console 516 can perform a different set of actions associated with the potentially full-scale anomalies. For example, the monitoring console 516 can provide notifications for anomalies detected using the high-speed anomaly detection operations while performing automated actions using the full-scale anomaly detection operations, or vice versa. Additionally or alternatively, the monitoring console 516 can cancel potentially false positives identified using the high-speed anomaly detection operations that were not detected using the full-scale anomaly detection operations.

In some implementations, the search system 560 uses separate sensitivities when executing the full-scale anomaly detection operations as compared to the sensitivities used when executing the high-speed anomaly detection operations. For example, the search system 560 can set one or more sensitivity thresholds to lower values when executing high-speed anomaly detection operations (due to processing less data) and change the one or more sensitivity thresholds to higher values when executing the full-scale anomaly detection operations. Additionally or alternatively, the search system 560 can add or remove sensitivities for the respective anomaly detection operations. For example, the search system 560 can use a single minimum sensitivity threshold when performing the high-speed anomaly detection operations and can add a maximum sensitivity threshold when performing the full-scale anomaly detection operations.

In some implementations, the search system 560 trains a ML model and/or uses a trained ML model to perform either the high-speed anomaly detection operations or the full-scale anomaly detection operations. For example, the ML model can be trained to set the one or more sensitivity thresholds associated with the anomaly detection operations. In such instances, the ML model analyzes the applicable events 220 by comparing the events to the one or more sensitivity thresholds. In some implementations, the same ML model or a different ML model can be trained to select the events to be included in the sampled set of events 224. Similarly, the ML model can set the sensitivity threshold based on the quantity of events that match search criteria (e.g., setting the sensitivity threshold to "4" for a search of "physical badge 'access denied' events occurring between 02:00-05:00"). In such instances, the search system 560 can detect an anomaly when the quantity of events matching the criteria exceeds the sensitivity threshold.

Figure 6:
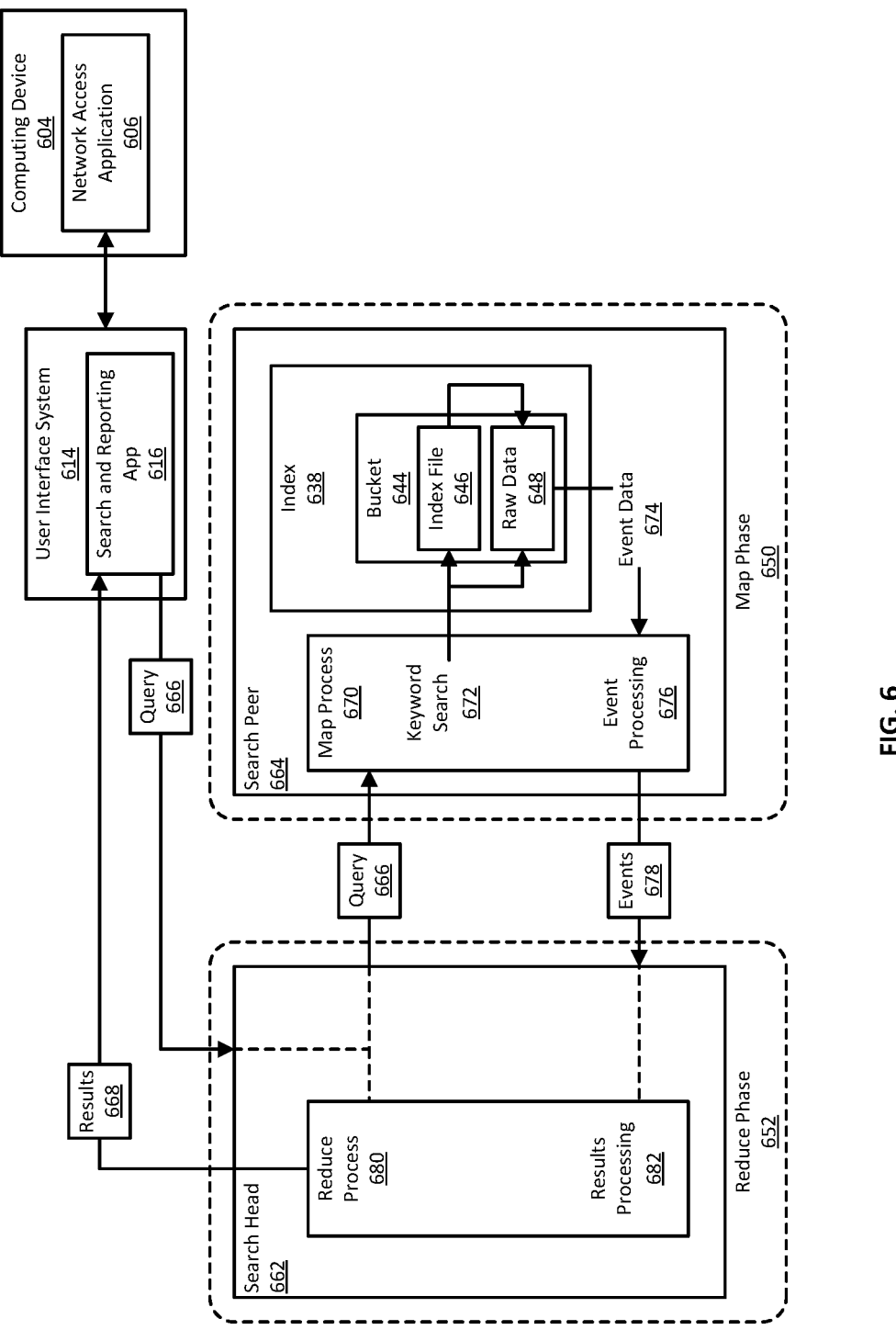
FIG. 6 is a block diagram illustrating in greater detail an example of the search system of a data intake and query system, in accordance with example implementations.

FIG. 6 is a block diagram illustrating in greater detail an example of the search system 660 of a data intake and query system, such as the data intake and query system 110 of FIG. 1. The search system 660 of FIG. 6 issues a query 666 to a search head 662, which sends the query 666 to a search peer 664. Using a map process 670, the search peer 664 searches the appropriate index 638 for events identified by the query 666 and sends events 678 so identified back to the search head 662. Using a reduce process 682, the search head 662 processes the events 678 and produces results 668 to respond to the query 666. The results 668 can provide useful insights about the data stored in the index 638. These insights can aid in the administration of information technology systems, in security analysis of information technology systems, and/or in analysis of the development environment provided by information technology systems.

The query 666 that initiates a search is produced by a search and reporting app 616 that is available through the user interface system 614 of the data intake and query system. Using a network access application 606 executing on a computing device 604, a user can input the query 666 into a search field provided by the search and reporting app 616. Alternatively or additionally, the search and reporting app 616 can include pre-configured queries or stored queries that can be activated by the user. In some cases, the search and reporting app 616 initiates the query 666 when the user enters the query 666. In these cases, the query 666 maybe referred to as an "ad-hoc" query. In some cases, the search and reporting app 616 initiates the query 666 based on a schedule. For example, the search and reporting app 616 can be configured to execute the query 666 once per hour, once per day, at a specific time, on a specific date, or at some other time that can be specified by a date, time, and/or frequency. These types of queries maybe referred to as scheduled queries.

The query 666 is specified using a search processing language. The search processing language includes commands or search terms that the search peer 664 will use to identify events to return in the search results 668. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 666 to include sequential commands, where a subsequent command may operate on the results of a prior command. As an example, sequential commands may be separated in the query 666 by a vertical line ("|" or "pipe") symbol.

In addition to one or more search commands, the query 666 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 666 occurs in two broad phases: a map phase 650 and a reduce phase 652. The map phase 650 takes place across one or more search peers. In the map phase 650, the search peers locate event data that matches the search terms in the search query 666 and sorts the event data into field-value pairs. When the map phase 650 is complete, the search peers send events that they have found to one or more search heads for the reduce phase 652. During the reduce phase 652, the search heads process the events through commands in the search query 666 and aggregate the events to produce the final search results 668.

A search head, such as the search head 662 illustrated in FIG. 6, is a component of the search system 660 that manages searches. The search head 662, which may also be referred to herein as a search management component, can be implemented using program code that can be executed on a computing device. The program code for the search head 662 can be stored on a non-transitory computer-readable medium and from this medium can be loaded or copied to the memory of a computing device. One or more hardware processors of the computing device can read the program code from the memory and execute the program code in order to implement the operations of the search head 662.

Upon receiving the search query 666, the search head 662 directs the query 666 to one or more search peers, such as the search peer 664 illustrated in FIG. 6. "Search peer" is an alternate name for "indexer" and a search peer may be largely similar to the indexer described previously. The search peer 664 may be referred to as a "peer node" when the search peer 664 is part of an indexer cluster. The search peer 664, which may also be referred to as a search execution component, can be implemented using program code that can be executed on a computing device. In some implementations, one set of program code implements both the search head 662 and the search peer 664 such that the search head 662 and the search peer 664 form one component. In some implementations, the search head 662 is an independent piece of code that performs searching and no indexing functionality. In these implementations, the search head 662 may be referred to as a dedicated search head.

The search head 662 may consider multiple criteria when determining whether to send the query 666 to the particular search peer 664. For example, the search system 660 may be configured to include multiple search peers that each have duplicative copies of at least some of the event data and are implanted using different hardware resources q. In this example, the sending the search query 666 to more than one search peer allows the search system 660 to distribute the search workload across different hardware resources. As another example, search system 660 may include different search peers for different purposes (e.g., one has an index storing a first type of data or from a first data source while a second has an index storing a second type of data or from a second data source). In this example, the search query 666 may specify which indexes to search, and the search head 662 will send the query 666 to the search peers that have those indexes.

To identify events 678 to send back to the search head 662, the search peer 664 performs a map process 670 to obtain event data 674 from the index 638 that is maintained by the search peer 664. During a first phase of the map process 670, the search peer 664 identifies buckets that have events that are described by the time indicator in the search query 666. As noted above, a bucket contains events whose timestamps fall within a particular range of time. For each bucket 644 whose events can be described by the time indicator, during a second phase of the map process 670, the search peer 664 performs a keyword search 672 using search terms specified in the search query 666. The search terms can be one or more of keywords, phrases, fields, Boolean expressions, and/or comparison expressions that in combination describe events being searched for. When segmentation is enabled at index time, the search peer 664 performs the keyword search 672 on the bucket's index file 646. As noted previously, the index file 646 includes a lexicon of the searchable terms in the events stored in the bucket's raw data 648 file. The keyword search 672 searches the lexicon for searchable terms that correspond to one or more of the search terms in the query 666. As also noted above, the lexicon incudes, for each searchable term, a reference to each location in the raw data 648 file where the searchable term can be found. Thus, when the keyword search identifies a searchable term in the index file 646 that matches a search term in the query 666, the search peer 664 can use the location references to extract from the raw data 648 file the event data 674 for each event that include the searchable term.

In cases where segmentation was disabled at index time, the search peer 664 performs the keyword search 672 directly on the raw data 648 file. To search the raw data 648, the search peer 664 may identify searchable segments in events in a similar manner as when the data was indexed. Thus, depending on how the search peer 664 is configured, the search peer 664 may look at event fields and/or parts of event fields to determine whether an event matches the query 666. Any matching events can be added to the event data #A74 read from the raw data 648 file. The search peer 664 can further be configured to enable segmentation at search time, so that searching of the index 638 causes the search peer 664 to build a lexicon in the index file 646.

The event data 674 obtained from the raw data 648 file includes the full text of each event found by the keyword search 672. During a third phase of the map process 670, the search peer 664 performs event processing 676 on the event data 674, with the steps performed being determined by the configuration of the search peer 664 and/or commands in the search query 666. For example, the search peer 664 can be configured to perform field discovery and field extraction. Field discovery is a process by which the search peer 664 identifies and extracts key-value pairs from the events in the event data 674. The search peer 664 can, for example, be configured to automatically extract the first 100 fields (or another number of fields) in the event data 674 that can be identified as key-value pairs. As another example, the search peer 664 can extract any fields explicitly mentioned in the search query 666. The search peer 664 can, alternatively or additionally, be configured with particular field extractions to perform.

Other examples of steps that can be performed during event processing 676 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 664 sends processed events 678 to the search head 662, which performs a reduce process 680. The reduce process 680 potentially receives events from multiple search peers and performs various results processing 682 steps on the received events. The results processing 682 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 682 can further include applying commands from the search query 666 to the events. The query 666 can include, for example, commands for evaluating and/or manipulating fields (e.g., to generate new fields from existing fields or parse fields that have more than one value). As another example, the query 666 can include commands for calculating statistics over the events, such as counts of the occurrences of fields, or sums, averages, ranges, and so on, of field values. As another example, the query 666 can include commands for generating statistical values for purposes of generating charts of graphs of the events.

The reduce process 680 outputs the events found by the search query 666, as well as information about the events. The search head 662 transmits the events and the information about the events as search results 668, which are received by the search and reporting app 616. The search and reporting app 616 can generate visual interfaces for viewing the search results 668. The search and reporting app 616 can, for example, output visual interfaces for the network access application 606 running on a computing device 604 to generate.

The visual interfaces can include various visualizations of the search results 668, such as tables, line or area charts, Chloropleth maps, or single values. The search and reporting app 616 can organize the visualizations into a dashboard, where the dashboard includes a panel for each visualization. A dashboard can thus include, for example, a panel listing the raw event data for the events in the search results 668, a panel listing fields extracted at index time and/or found through field discovery along with statistics for those fields, and/or a timeline chart indicating how many events occurred at specific points in time (as indicated by the timestamps associated with each event). In various implementations, the search and reporting app 616 can provide one or more default dashboards. Alternatively or additionally, the search and reporting app 616 can include functionality that enables a user to configure custom dashboards.

The search and reporting app 616 can also enable further investigation into the events in the search results 668. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 666. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 7:
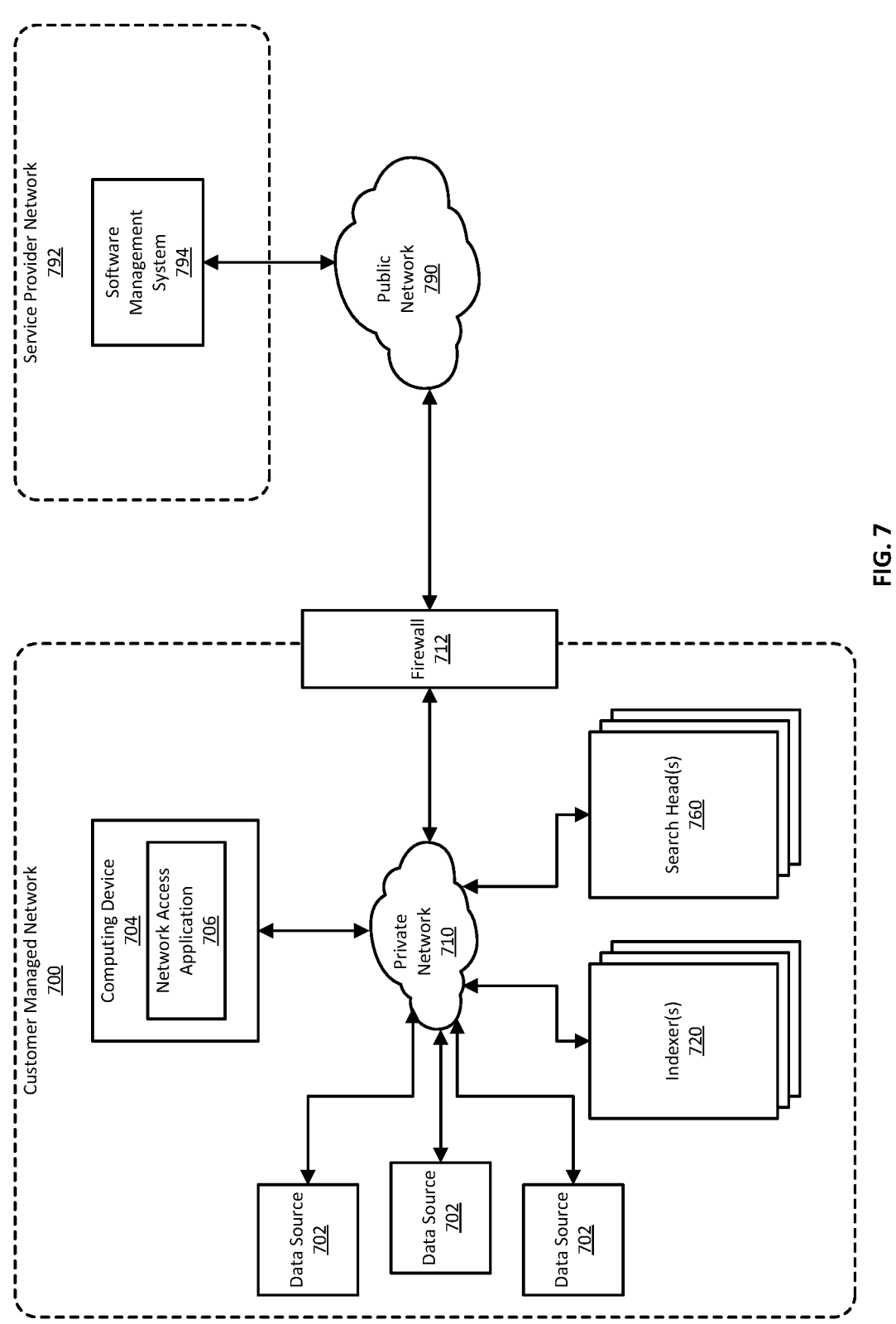
FIG. 7 illustrates an example of a self-managed network that includes a data intake and query system, in accordance with example implementations.

FIG. 7 illustrates an example of a self-managed network 700 that includes a data intake and query system. "Self-managed" in this instance means that the entity that is operating the self-managed network 700 configures, administers, maintains, and/or operates the data intake and query system using its own compute resources and people. Further, the self-managed network 700 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 700 is located within the customer's on-prem environment, such as in the entity's data center, the operation and management of the self-managed network 700, including of the resources in the self-managed network 700, is under the control of the entity. For example, administrative personnel of the entity have complete access to and control over the configuration, management, and security of the self-managed network 700 and its resources.

The self-managed network 700 can execute one or more instances of the data intake and query system. An instance of the data intake and query system may be executed by one or more computing devices that are part of the self-managed network 700. A data intake and query system instance can comprise an indexing system and a search system, where the indexing system includes one or more indexers 720 and the search system includes one or more search heads 760.

As depicted in FIG. 7, the self-managed network 700 can include one or more data sources 702. Data received from these data sources may be processed by an instance of the data intake and query system within self-managed network 700. The data sources 702 and the data intake and query system instance can be communicatively coupled to each other via a private network 710.

Users associated with the entity can interact with and avail themselves of the functions performed by a data intake and query system instance using computing devices. As depicted in FIG. 7, a computing device 704 can execute a network access application 706 (e.g., a web browser), that can communicate with the data intake and query system instance and with data sources 702 via the private network 710. Using the computing device 704, a user can perform various operations with respect to the data intake and query system, such as management and administration of the data intake and query system, generation of knowledge objects, and other functions. Results generated from processing performed by the data intake and query system instance may be communicated to the computing device 704 and output to the user via an output system (e.g., a screen) of the computing device 704.

The self-managed network 700 can also be connected to other networks that are outside the entity's on-premise environment/network, such as networks outside the entity's data center. Connectivity to these other external networks is controlled and regulated through one or more layers of security provided by the self-managed network 700. One or more of these security layers can be implemented using firewalls 712. The firewalls 712 form a layer of security around the self-managed network 700 and regulate the transmission of traffic from the self-managed network 700 to the other networks and from these other networks to the self-managed network 700.

Networks external to the self-managed network can include various types of networks including public networks 790, other private networks, and/or cloud networks provided by one or more cloud service providers. An example of a public network 790 is the Internet. In the example depicted in FIG. 7, the self-managed network 700 is connected to a service provider network 792 provided by a cloud service provider via the public network 790.

In some implementations, resources provided by a cloud service provider may be used to facilitate the configuration and management of resources within the self-managed network 700. For example, configuration and management of a data intake and query system instance in the self-managed network 700 may be facilitated by a software management system 794 operating in the service provider network 792. There are various ways in which the software management system 794 can facilitate the configuration and management of a data intake and query system instance within the self-managed network 700. As one example, the software management system 794 may facilitate the download of software including software updates for the data intake and query system. In this example, the software management system 794 may store information indicative of the versions of the various data intake and query system instances present in the self-managed network 700. When a software patch or upgrade is available for an instance, the software management system 794 may inform the self-managed network 700 of the patch or upgrade. This can be done via messages communicated from the software management system 794 to the self-managed network 700.

The software management system 794 may also provide simplified ways for the patches and/or upgrades to be downloaded and applied to the self-managed network 700. For example, a message communicated from the software management system 794 to the self-managed network 700 regarding a software upgrade may include a Uniform Resource Identifier (URI) that can be used by a system administrator of the self-managed network 700 to download the upgrade to the self-managed network 700. In this manner, management resources provided by a cloud service provider using the service provider network 792 and which are located outside the self-managed network 700 can be used to facilitate the configuration and management of one or more resources within the entity's on-prem environment. In some implementations, the download of the upgrades and patches may be automated, whereby the software management system 794 is authorized to, upon determining that a patch is applicable to a data intake and query system instance inside the self-managed network 700, automatically communicate the upgrade or patch to self-managed network 700 and cause it to be installed within self-managed network 700.

Figure 8:
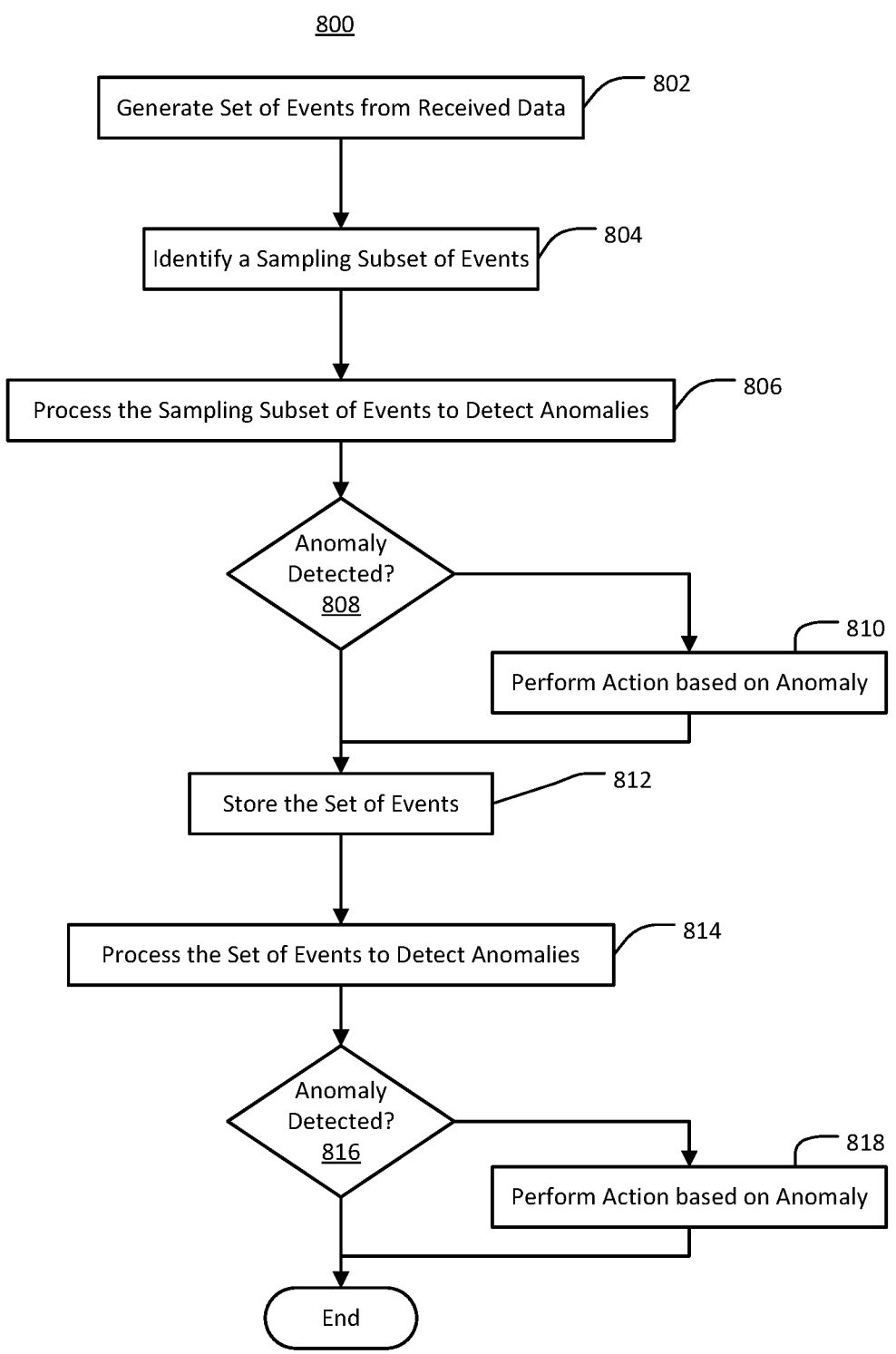
FIG. 8 illustrates a flowchart of an example process for processing a set of events to detect an anomaly, in accordance with example implementations.

FIG. 8 illustrates a flowchart of an example process for processing a set of events to detect an anomaly, in accordance with example implementations. The example process 800 can be implemented, for example, by a computing device that comprises a processor and a non-transitory computer-readable medium. The non-transitory computer readable medium can be storing instructions that, when executed by the processor, can cause the processor to perform the operations of the illustrated process 800. Alternatively or additionally, the process 800 can be implemented using a non-transitory computer-readable medium storing instructions that, when executed by one or more processors, case the one or more processors to perform the operations of the process 800 of FIG. 8.

Process 800 begins at step 802, where a device in a computing environment generates a set of events from received data. In various implementations, a device in a computing environment 100, such as an edge processor 204 and/or an indexer 532 in an indexing system 160, generates a set of events 220 based on data received from a data source 102. For example, the edge processor 204 can collect data from one or more data sources 202 into an internal dataset 210 and can generate a full set of events 222 from the internal dataset 210.

At step 804, the system identifies a sampling set of events. In various implementations, the edge processor 204 and/or the indexer 532 samples, from the set of events, a subset of events (e.g., selecting 1% of the full set of events 222). For example, the edge processor 204 and/or the indexer 532 can add sampling flag values 340 to each event 220 and identify, from the full set of events 220, a sampled set of events 224 that have sampling flag values 340 that match specified criteria. Additionally or alternatively, in some implementations, the edge processor 204 identifies a subset of the full set of events 222 for routing to the high-speed pipeline 240. In such instances, the dataset router 230 of the edge processor 204 routes the full set of events 222 to the full-scale pipeline 250 while also routing the sampled set of events 224 to the high-speed pipeline 240. In some implementations, the edge processor 204 (using the high-speed pipeline 240 and the full-scale pipeline) or the indexer 532 stores the sampled set of events 224 in a high-speed index 550 that is separate from the index 538, which stores the remaining events from the full set of events 222. In such instances, the indexer 532 causes each event 220 identified as being in the sampled set of events 224 to be stored in the high-speed index 550.

At step 806, the system processes the sampling subset of events to detect anomalies. In various implementations, the edge processor 204 and/or the search system 560 identifies, via a first set of anomaly detection operations processing the subset of events, a first set of anomalies associated with a subset of events. For example, the high-speed pipeline 240 can perform one or more high-speed anomaly detection operations using a first set of sensitivity thresholds to detect anomalous activity. In another example, the search system uses the high-speed anomaly detection operations to detect anomalies within the sampled set of events 224 stored in the index 438 (identified using the sampling flag values 340) or stored in the high-speed index 550.

At step 808, the system determines whether an anomaly is detected. In various implementations, the edge processor 204 and/or the search system 560 uses the high-speed anomaly detection operations to determine whether the sampled set of events 224 includes anomalous activities or behaviors. For example, the search system 560 can use the high-speed anomaly detection operations and sensitivity thresholds to determine whether a specific IP address has made an anomalous number of requests (indicating fraudulent activities). When the system detects an anomaly, the system proceeds to step 810. Otherwise, the system does not detect an anomaly using the high-speed anomaly detection operations and proceeds to step 812.

At step 810, the device performs an action based on the detected anomaly. In various implementations, upon detecting an anomaly using the high-speed anomaly operations ("high-speed anomaly"), the edge processor 204 and/or the search system 560 can perform one or more actions based on the anomaly. For example, the search system 560 can provide the monitoring console 516 with a report that indicates a likelihood of fraudulent activity (e.g., "75%" or "high"). In such instances, the report can include a notification section, icon, or field indicating the likelihood of potentially fraudulent activity that was detected using high-speed detection operations. In another example, the search system 560 can perform automated actions associated with detecting anomalies using the high-speed detection operations. For example, upon identifying a particular IP address associated with high rates of errors in request (indicating potentially fraudulent activity), the monitoring console 516 can automatically block the identified IP address for a period of time.

At step 812, the system stores the set of events. In various implementations, the indexer 432, 532 stores the full set of events 222 generated from the received data. For example, the indexer 432 can store the full set of events 222 in the index 438. In some implementations, each event can include a sampling flag value 340 that the searching system 160 uses to retrieve the sampled set of events 222 from the index 438. Alternatively, in another example, the indexer 532 can store the sampled set of events 222 in the high-speed index 550 while storing the remaining events from the full set of events 222 in the index 538.

At step 814, the system processes the set of events to detect anomalies. In various implementations, the searching system 160, 560 identifies, via a second set of anomaly detections operations processing the set of events, a second set of anomalies associated with a set of events. For example, the searching system 160 can, after performing the high-speed anomaly detection operations on the sampled set of events 224, execute one or more full-scale anomaly detection operations on the full set of events 222 stored in the index 438 to identify one or more anomalies. In another example, the searching system 560 can execute one or more full-scale anomaly detection operations on the full set of events 222 collectively stored in the index 538 and the high-speed index 550.

At step 816, the system determines whether an anomaly is detected. In various implementations, the searching system 160, 560 determines whether the full set of events 222 includes anomalous data. The sampled set of events 224 can contain a much lower number of events (e.g., 1%). As a result, the search system 160 performing full-scale anomaly detection operations can identify new and/or different anomalies than the anomalies detected using the high-speed anomaly detection operations. In some implementations, the search system 560 uses separate sensitivities when executing the full-scale anomaly detection operations as compared to the sensitivities used when executing the high-speed anomaly detection operations. For example, the search system 560 can set one or more sensitivity thresholds to lower values when executing high-speed anomaly detection operations (due to processing less data) and change the one or more sensitivity thresholds to higher values when executing the full-scale anomaly detection operations. Additionally or alternatively, the search system 560 can add or remove sensitivities for the respective anomaly detection operations. For example, the search system 560 can use a single minimum sensitivity threshold when performing the high-speed anomaly detection operations and can add a maximum sensitivity threshold when performing the full-scale anomaly detection operations.

In some implementations, the search system 560 trains a ML model and/or uses a trained ML model to perform either the high-speed anomaly detection operations or the full-scale anomaly detection operations. For example, the ML model can be trained to set the one or more sensitivity thresholds associated with the anomaly detection operations. In such instances, the ML model analyzes the applicable events 220 by comparing the events to the one or more sensitivity thresholds. In some implementations, the same ML model or a different ML model can be trained to select the events to be included in the sampled set of events 224. Similarly, the ML model can set the sensitivity threshold based on the quantity of events that match search criteria (e.g., setting the sensitivity threshold to "4" for a search of "physical badge 'access denied' events occurring between 02:00-05:00"). In such instances, the search system 560 can detect an anomaly when the quantity of events matching the criteria exceeds the sensitivity threshold.

When the system detects an anomaly, the system proceeds to step 818. Otherwise, the system does not detect an anomaly and ends process 800.

At step 818, the system performs one or more actions based on the detected anomaly. In various implementations, the searching system 160, 560 and/or the monitoring console 416, 516 performs one or more actions associated with detecting anomalies identified from performing one or more full-scale anomaly detection operations ("full-scale anomaly"). In such instances, the searching system 160, 560 and/or the monitoring console 416, 516 can perform a different set of actions associated with the potentially full-scale anomaly. For example, the monitoring console 516 can provide notifications for anomalies detected using the high-speed anomaly detection operations while performing automated actions using the full-scale anomaly detection operations, or vice versa. Additionally or alternatively, the monitoring console 516 can cancel potentially false positives identified using the high-speed anomaly detection operations that were not detected using the full-scale anomaly detection operations. Upon performing the one or more actions, the system ends process 4 800.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/ steps described herein may be performed in any sequence and/or in any combination, and (ii) the components of respective embodiments may be combined in any manner.

1. In various embodiments, a computer-implemented method comprises generating a set of events based on data received from a data source, sampling, from the set of events, a subset of events, identifying, via a first set of anomaly detection operations processing the subset of events, a first set of anomalies associated with a subset of events, and identifying, via a second set of anomaly detections operations processing the set of events, a second set of anomalies associated with a set of events, where the first set of anomalies comprises a subset of the second set of anomalies, and where the first set of anomalies are identified prior to the second set of anomalies.

2. The computer-implemented method of clause 1, further comprising for each event in the set of events, adding a sampling field value, where sampling the subset of events comprises identifying each event in the set of events having a sampling field value that meets sampling criteria.

3. The computer-implemented method of clause 1 or 2, where sampling the subset of event comprises executing an object query specifying the sampling criteria, and the object query is associated with a data model representing a view of the set of events.

4. The computer-implemented method of any of clauses 1-3, where an edge processor receives the data from the data source, the edge processor executes at least a portion of the first set of anomaly detection operations, and the edge processor executes at least a portion of the second set of anomaly detections operations.

5. The computer-implemented method of any of clauses 1-4, further comprising indexing the subset of events into a first index of a data store, wherein the first set of anomaly detection operations is performed on the subset of events in the first index, and indexing the set of events in a second index of the data store, wherein the second set of anomaly detection operations is performed on the subset of events in the second index.

6. The computer-implemented method of any of clauses 1-5, further comprising upon identifying the first set of anomalies or the second set of anomalies, generating a notification report.

7. The computer-implemented method of any of clauses 1-6, where the notification report includes a label for each of the first set of anomalies.

8. The computer-implemented method of any of clauses 1-7, further comprising, upon identifying the first set of anomalies or the second set of anomalies, performing an automated action associated with the first set of anomalies or the second set of anomalies.

9. The computer-implemented method of any of clauses 1-8, where the first set of anomaly detection operations processing the subset of events comprises a trained machine learning (ML) model receiving the subset of events as inputs, the trained ML model generates a sensitivity threshold from a training set of data, and the trained ML model analyzes the subset of events for an anomaly compared to the sensitivity threshold.

10. The computer-implemented method of any of clauses 1-9, where identifying the first set of anomalies comprises detecting a number of events in the subset of events that meets a first search criterion, and identifying a first anomaly included in the first set of anomalies upon determining that the number of events exceeds a sensitivity threshold associated with the first anomaly.

11. The computer-implemented method of any of clauses 1-10, where each event in the set of events includes a portion of unstructured raw machine data reflecting activity in an information technology environment, and the first set of anomalies or the second set of anomalies indicate a likelihood of fraudulent activity associated with the information technology environment.

12. The computer-implemented method of any of clauses 1-11, where the first set of anomaly detection operations uses a first set of sensitivity thresholds on the subset of events to identify the first set of anomalies, the second set of anomaly detection operations uses a second set of sensitivity thresholds on the set of events to identify the second set of anomalies, and the second set of sensitivity thresholds is greater than the first set of sensitivity thresholds.

13. The computer-implemented method of any of clauses 1-12, where the subset of events comprises 10% or fewer of the set of events.

14. In various embodiments, a computing device comprises a processor, and a non-transitory computer-readable medium having stored thereon instructions that, when executed by the processor, cause the processor to perform operations including generating a set of events based on data received from a data source, sampling, from the set of events, a subset of events, identifying, via a first set of anomaly detection operations processing the subset of events, a first set of anomalies associated with a subset of events, and identifying, via a second set of anomaly detections operations processing the set of events, a second set of anomalies associated with a set of events, where the first set of anomalies comprises a subset of the second set of anomalies, and wherein the first set of anomalies are identified prior to the second set of anomalies.

15. The computer device of clause 14, where the operations further include, for each event in the set of events, adding a sampling field value, sampling the subset of events comprises executing an object query specifying sampling criteria, where each event in the set of events has a sampling field value that meets the sampling criteria, and the object query is associated with a data model representing a view of the set of events.

16. The computer device of clause 14 or 15, where an edge processor receives the data from the data source, the edge processor executes at least a portion of the first set of anomaly detection operations, and the edge processor executes at least a portion of the second set of anomaly detections operations.

17. The computer device of any of clauses 14-16, where further the operations further include indexing the subset of events into a first index of a data store, wherein the first set of anomaly detection operations is performed on the subset of events in the first index, and indexing the set of events in a second index of the data store, wherein the second set of anomaly detection operations is performed on the subset of events in the second index.

18. In various embodiments, one or more non-transitory computer-readable media have stored thereon instructions that, when executed by one or more processors, cause the one or more processors to perform operations including generating a set of events based on data received from a data source, sampling, from the set of events, a subset of events, identifying, via a first set of anomaly detection operations processing the subset of events, a first set of anomalies associated with a subset of events, and identifying, via a second set of anomaly detections operations processing the set of events, a second set of anomalies associated with a set of events, where the first set of anomalies comprises a subset of the second set of anomalies, and where the first set of anomalies are identified prior to the second set of anomalies.

19. The one or more non-transitory computer-readable media of clause 18, further comprising instructions that, when executed by the one or more processors, cause the one or more processors to further perform the operations including, for each event in the set of events, adding a sampling field value, where sampling the subset of events comprises executing an object query specifying sampling criteria, where each event in the set of events has a sampling field value that meets the sampling criteria, and the object query is associated with a data model representing a view of the set of events.

20. The one or more non-transitory computer-readable media of clause 18 or 19, where an edge processor receives the data from the data source, the edge processor executes at least a portion of the first set of anomaly detection operations, and the edge processor executes at least a portion of the second set of anomaly detections operations.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:

generating, by an edge processor, a set of events based on data received from a data source;

sampling, from the set of events, a subset of events, wherein the subset of events is selected by the edge processor based on a sample flag value associated with each event of the set of events;

identifying, via a set of high speed anomaly detection operations processing the subset of events using a first set of sensitivity thresholds, a first set of anomalies associated with the subset of events wherein the first set of sensitivity thresholds corresponds to a first quantity of events that match predefined search criteria;

identifying, via a set of full scale anomaly detection operations processing the set of events using a second set of sensitivity thresholds that correspond to thresholds of a greater quantity than the first set of sensitivity thresholds, a second set of anomalies associated with the set of events, wherein the first set of anomalies comprises a subset of the second set of anomalies, and wherein the first set of anomalies are identified prior to the second set of anomalies, wherein at least one of the first set of anomalies or the second set of anomalies includes identifying an event or series of events that deviate from a standard, user accounts with anomalous metadata, anomalous combinations of transactions, or a high rate of errors from a particular internet protocol (IP) address;

forwarding, by the edge processor, a reduced dataset relative to the data received from the data source to a data intake and query system, wherein the reduced dataset includes the first set of anomalies and the second set of anomalies;

generating a user interface that includes an indication of a likelihood of a presence of either the first set of anomalies or the second set of anomalies, wherein the user interface is configured for display on a computing device, and blocking an identified internet protocol (IP) address associated with either the first set of anomalies or the second set of anomalies.

2. The computer-implemented method of claim 1, further comprising: for each event in the set of events, adding a sampling field value, wherein sampling the subset of events comprises identifying each event in the set of events having a sampling field value that meets sampling criteria.

3. The computer-implemented method of claim 2, wherein:

sampling the subset of event comprises executing an object query specifying the sampling criteria, and the object query is associated with a data model representing a view of the set of events.

4. The computer-implemented method of claim 1, wherein: an edge processor receives the data from the data source, the edge processor executes at least a portion of the first set of anomaly detection operations, and the edge processor executes at least a portion of the second set of anomaly detections operations.

5. The computer-implemented method of claim 1, further comprising:

indexing the subset of events into a first index of a data store, wherein the first set of anomaly detection operations is performed on the subset of events in the first index; and indexing the set of events in a second index of the data store, wherein the second set of anomaly detection operations is performed on the subset of events in the second index.

6. The computer-implemented method of claim 1, further comprising:

upon identifying the first set of anomalies or the second set of anomalies, generating a notification report.

7. The computer-implemented method of claim 6, wherein the notification report includes a label for each of the first set of anomalies.

8. The computer-implemented method of claim 1, wherein:

the first set of anomaly detection operations processing the subset of events comprises a trained machine learning (ML) model receiving the subset of events as inputs, the trained ML model generates a sensitivity threshold from a training set of data, and the trained ML model analyzes the subset of events for an anomaly compared to the sensitivity threshold.

9. The computer-implemented method of claim 1, wherein identifying the first set of anomalies comprises:

detecting a number of events in the subset of events that meets a first search criterion; and identifying a first anomaly included in the first set of anomalies upon determining that the number of events exceeds a sensitivity threshold associated with the first anomaly.

10. The computer-implemented method of claim 1, wherein:

each event in the set of events includes a portion of unstructured raw machine data reflecting activity in an information technology environment, and the first set of anomalies or the second set of anomalies indicate a likelihood of fraudulent activity associated with the information technology environment.

11. The computer-implemented method of claim 1, wherein:

the first set of anomaly detection operations uses a first set of sensitivity thresholds on the subset of events to identify the first set of anomalies;

the second set of anomaly detection operations uses a second set of sensitivity thresholds on the set of events to identify the second set of anomalies, and the second set of sensitivity thresholds is greater than the first set of sensitivity thresholds.

12. The computer-implemented method of claim 1, wherein the subset of events comprises 10% or fewer of the set of events.

13. A computing device, comprising: a processor; and a non-transitory computer-readable medium having stored thereon instructions that, when executed by the processor, cause the processor to perform operations including:

generating, by an edge processor, a set of events based on data received from a data source;

sampling, from the set of events, a subset of events, wherein the subset of events is selected by the edge processor based on a sample flag value associated with each event of the set of events;

identifying, via a set of high speed anomaly detection operations processing the subset of events using a first set of sensitivity thresholds, a first set of anomalies associated with the subset of events wherein the first set of sensitivity thresholds corresponds to a first quantity of events that match predefined search criteria;

identifying, via a set of full scale anomaly detection operations processing the set of events using a second set of sensitivity thresholds that correspond to thresholds of a greater quantity than the first set of sensitivity thresholds, a second set of anomalies associated with the set of events, wherein the first set of anomalies comprises a subset of the second set of anomalies, and wherein the first set of anomalies are identified prior to the second set of anomalies, wherein at least one of the first set of anomalies or the second set of anomalies includes identifying an event or series of events that deviate from a standard, user accounts with anomalous metadata, anomalous combinations of transactions, or a high rate of errors from a particular internet protocol (IP) address;

forwarding, by the edge processor, a reduced dataset relative to the data received from the data source to a data intake and query system, wherein the reduced dataset includes the first set of anomalies and the second set of anomalies;

generating a user interface that includes an indication of a likelihood of a presence of either the first set of anomalies or the second set of anomalies, wherein the user interface is configured for display on a computing device, and blocking an identified internet protocol (IP) address associated with either the first set of anomalies or the second set of anomalies.

14. The computer device of claim 13, wherein:

the operations further include, for each event in the set of events, adding a sampling field value, sampling the subset of events comprises executing an object query specifying sampling criteria, where each event in the set of events has a sampling field value that meets the sampling criteria, and the object query is associated with a data model representing a view of the set of events.

15. The computer device of claim 13, wherein:

an edge processor receives the data from the data source, the edge processor executes at least a portion of the first set of anomaly detection operations, and the edge processor executes at least a portion of the second set of anomaly detections operations.

16. The computer device of claim 13, wherein further the operations further include:

indexing the subset of events into a first index of a data store, wherein the first set of anomaly detection operations is performed on the subset of events in the first index; and indexing the set of events in a second index of the data store, wherein the second set of anomaly detection operations is performed on the subset of events in the second index.

17. The computer device of claim 13, wherein the first set of anomalies and the second set of anomalies each includes one or more anomalies.

18. One or more non-transitory computer-readable media having stored thereon instructions that, when executed by one or more processors, cause the one or more processors to perform operations including:

generating, by an edge processor, a set of events based on data received from a data source;

sampling, from the set of events, a subset of events, wherein the subset of events is selected by the edge processor based on a sample flag value associated with each event of the set of events;

identifying, via a set of high speed anomaly detection operations processing the subset of events using a first set of sensitivity thresholds, a first set of anomalies associated with the subset of events wherein the first set of sensitivity thresholds corresponds to a first quantity of events that match predefined search criteria;

identifying, via a set of full scale anomaly detection operations processing the set of events using a second set of sensitivity thresholds that correspond to thresholds of a greater quantity than the first set of sensitivity thresholds, a second set of anomalies associated with the set of events, wherein the first set of anomalies comprises a subset of the second set of anomalies, and wherein the first set of anomalies are identified prior to the second set of anomalies, wherein at least one of the first set of anomalies or the second set of anomalies includes identifying an event or series of events that deviate from a standard, user accounts with anomalous metadata, anomalous combinations of transactions, or a high rate of errors from a particular internet protocol (IP) address;

forwarding, by the edge processor, a reduced dataset relative to the data received from the data source to a data intake and query system, wherein the reduced dataset includes the first set of anomalies and the second set of anomalies;

generating a user interface that includes an indication of a likelihood of a presence of either the first set of anomalies or the second set of anomalies, wherein the user interface is configured for display on a computing device, and blocking an identified internet protocol (IP) address associated with either the first set of anomalies or the second set of anomalies.

19. The one or more non-transitory computer-readable media of claim 18, further comprising instructions that, when executed by the one or more processors, cause the one or more processors to further perform the operations including, for each event in the set of events, adding a sampling field value, wherein:

sampling the subset of events comprises executing an object query specifying sampling criteria, where each event in the set of events has a sampling field value that meets the sampling criteria, and the object query is associated with a data model representing a view of the set of events.

20. The one or more non-transitory computer-readable media of claim 18, wherein: an edge processor receives the data from the data source, the edge processor executes at least a portion of the first set of anomaly detection operations, and the edge processor executes at least a portion of the second set of anomaly detections operations.

21. The computer-implemented method of claim 1, wherein the first set of anomalies and the second set of anomalies each includes one or more anomalies.

22. The one or more non-transitory computer-readable media of claim 18, wherein the first set of anomalies and the second set of anomalies each includes one or more anomalies.

\* \* \* \* \*